United States Patent
Maeda et al.

(10) Patent No.: US 9,232,184 B2
(45) Date of Patent: Jan. 5, 2016

(54) TRANSMISSION MANAGEMENT SYSTEM, TRANSMISSION SYSTEM, AND TRANSMISSION MANAGEMENT SYSTEM PROGRAM

(75) Inventors: Kaoru Maeda, Kanagawa (JP); Naoki Umehara, Kanagawa (JP); Takahiro Asai, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 172 days.

(21) Appl. No.: 13/996,784

(22) PCT Filed: Dec. 21, 2011

(86) PCT No.: PCT/JP2011/080543
§ 371 (c)(1),
(2), (4) Date: Jun. 21, 2013

(87) PCT Pub. No.: WO2012/086844
PCT Pub. Date: Jun. 28, 2012

(65) Prior Publication Data
US 2013/0278712 A1    Oct. 24, 2013

(30) Foreign Application Priority Data

Dec. 22, 2010  (JP) .................................. 2010-285985
Sep. 27, 2011  (JP) .................................. 2011-211015

(51) Int. Cl.
| | |
|---|---|
| H04N 7/15 | (2006.01) |
| H04L 29/06 | (2006.01) |
| H04L 12/18 | (2006.01) |
| H04L 12/911 | (2013.01) |

(52) U.S. Cl.
CPC .............. *H04N 7/15* (2013.01); *H04L 12/1818* (2013.01); *H04L 47/72* (2013.01); *H04L 65/4038* (2013.01); *H04L 65/80* (2013.01)

(58) Field of Classification Search
USPC ......................................... 348/14.08, 14.09
See application file for complete search history.

(56) References Cited

U.S. PATENT DOCUMENTS

| | | | |
|---|---|---|---|
| 6,434,164 B1 * | 8/2002 | Matsunaga et al. ........... 370/443 |
| 6,704,932 B1 * | 3/2004 | Matsunaga et al. ........... 725/126 |

(Continued)

FOREIGN PATENT DOCUMENTS

| | | |
|---|---|---|
| JP | 3128680 | 1/2001 |
| JP | 2003-324705 | 11/2003 |

(Continued)

OTHER PUBLICATIONS

Extended European Search Report issued on Jul. 17, 2014 in the corresponding European Application No. 11849956.5.

(Continued)

*Primary Examiner* — Joseph J Nguyen
*Assistant Examiner* — Phung-Hoang J. Nguyen
(74) *Attorney, Agent, or Firm* — Oblon, McClelland, Maier & Neustadt, L.L.P

(57) ABSTRACT

When terminals perform communication through a reservation, a management unit manages terminal identification information identifying each terminal and reservation identification information identifying the reservation. When a first terminal performs communication through a predetermined reservation, a receiving unit receives, from the first terminal, a request to acquire state of a second transmission terminal. A reservation extracting unit extracts the reservation identification information associated with terminal identification information identifying the second terminal from the management unit. A determining unit determines whether the reservation identified by the extracted reservation identification information matches the predetermined reservation. A transmitting unit transmits first state information indicating first state of the second terminal to the first terminal when the determining unit determines that the reservation matches the predetermined reservation, but transmits second state information indicating second state of the second terminal when the determining unit determines that the reservation does not match the predetermined reservation.

8 Claims, 23 Drawing Sheets

(56) References Cited

U.S. PATENT DOCUMENTS

| | | | |
|---|---|---|---|
| 2002/0078153 A1* | 6/2002 | Chung et al. | 709/204 |
| 2006/0034481 A1* | 2/2006 | Barzegar et al. | 381/401 |
| 2006/0147009 A1* | 7/2006 | Greenlee et al. | 379/202.01 |
| 2007/0285504 A1 | 12/2007 | Hesse | |
| 2010/0061538 A1 | 3/2010 | Coleman et al. | |
| 2010/0278127 A1* | 11/2010 | Jeon et al. | 370/329 |
| 2011/0219060 A1 | 9/2011 | Ohwada | |
| 2012/0314019 A1 | 12/2012 | Asai | |

FOREIGN PATENT DOCUMENTS

| | | |
|---|---|---|
| JP | 3586390 | 11/2004 |
| JP | 2005-191642 | 7/2005 |
| JP | 2005-332027 | 12/2005 |
| JP | 2006-005590 | 1/2006 |
| JP | 2007-052801 | 3/2007 |
| JP | 4292544 | 7/2009 |
| JP | 2011-199845 | 10/2011 |
| JP | 2011-205612 | 10/2011 |

OTHER PUBLICATIONS

International Search Report Issued Jan. 31, 2012 in PCT/JP2011/080543 Filed Dec. 21, 2011.
U.S. Appl. No. 13/777,389, filed Feb. 26, 2013, Maeda, et al.
U.S. Appl. No. 13/866,317, filed Apr. 19, 2013, Maeda.
U.S. Appl. No. 13/903,449, filed May 28, 2013, Maeda, et al.
U.S. Appl. No. 13/903,131, filed May 28, 2013, Maeda, et al.

* cited by examiner

LOW RESOLUTION

INTERMEDIATE RESOLUTION

HIGH RESOLUTION

RELAY DEVICE SELECTING UNIT — 56
- SESSION ID GENERATING UNIT — 56a
- RELAY DEVICE EXTRACTING UNIT — 56b
- SELECTING UNIT — 56c

| IP ADDRESS OF RELAY DESTINATION TERMINAL | IMAGE QUALITY OF IMAGE DATA TO BE RELAYED (QUALITY OF IMAGE) |
|---|---|
| 1.3.2.4 | HIGH QUALITY |
| 1.3.1.3 | LOW QUALITY |
| 1.3.2.3 | INTERMEDIATE QUALITY |
| ... | ... |

FIG.9

| RELAY DEVICE ID | OPERATION STATE | RECEPTION DATE AND TIME | IP ADDRESS OF RELAY DEVICE | MAXIMUM DATA TRANSMISSION RATE [Mbps] |
|---|---|---|---|---|
| 111a | ON LINE | 2010.11.10.13:00 | 1.2.1.2 | 100 |
| 111b | ON LINE | 2010.11.10.13:10 | 1.2.2.2 | 1000 |
| 111c | OFF LINE | 2010.11.10.13:20 | 1.3.1.2 | 100 |
| 111d | ON LINE | 2010.11.10.13:30 | 1.3.2.2 | 10 |

FIG.10

| TERMINAL ID | PASSWORD |
|---|---|
| 01aa | aaaa |
| 01ab | abab |
| 01ba | baba |
| ... | ... |

FIG.11

| TERMINAL ID | DESTINATION NAME | OPERATION STATE | RECEPTION DATE AND TIME | IP ADDRESS OF TERMINAL |
|---|---|---|---|---|
| 01aa | AA TERMINAL IN TOKYO OFFICE IN JAPAN | ON LINE | 2010.11.10. 13:40 | 1.2.1.3 |
| 01ab | AB TERMINAL IN TOKYO OFFICE IN JAPAN | BUSY | 2010.11.10. 13:40 | 1.2.1.4 |
| 01ac | AC TERMINAL IN TOKYO OFFICE IN JAPAN | OFF LINE | 2010.11.09. 12:00 | 1.2.1.5 |
| 01ad | AD TERMINAL IN TOKYO OFFICE IN JAPAN | ON LINE | 2010.11.10. 13:40 | 1.2.1.6 |
| 01ae | AE TERMINAL IN TOKYO OFFICE IN JAPAN | BUSY | 2010.11.10. 13:40 | 1.2.1.7 |
| 01af | AF TERMINAL IN TOKYO OFFICE IN JAPAN | OFF LINE | 2010.11.10. 12:45 | 1.2.1.8 |
| 01ba | BA TERMINAL IN OSAKA OFFICE IN JAPAN | BUSY | 2010.11.10.13:40 | 1.2.2.3 |
| 01bb | BB TERMINAL IN OSAKA OFFICE IN JAPAN | ON LINE | 2010.11.10. 13:40 | 1.2.2.4 |
| 01bc | BC TERMINAL IN OSAKA OFFICE IN JAPAN | OFF LINE | 2010.11.10. 12:45 | 1.2.2.5 |
| 01bd | BD TERMINAL IN OSAKA OFFICE IN JAPAN | ON LINE | 2010.11.10. 13:40 | 1.2.2.6 |
| 01cc | CC TERMINAL IN NEW YORK OFFICE IN USA | BUSY | 2010.11.10. 13:40 | 1.3.1.5 |
| 01cd | CD TERMINAL IN NEW YORK OFFICE IN USA | PAUSE | 2010.11.10. 13:40 | 1.3.1.6 |
| ... | ... | ... | ... | ... |

FIG.12

| REQUEST SOURCE TERMINAL ID | DESTINATION TERMINAL ID |
|---|---|
| 01aa | 01ab, ···, 01ba, 01bb, ···, 01ca, 01cb, 01da, 01db,··· |
| 01ab | 01aa, 01ca, 01cb |
| 01ba | 01aa, 01ab, 01ca, 01cb, 01da, 01db |
| ··· | ··· |
| 01db | 01aa, 01ab, 01ba, ···, 01da, 01ca, 01cb, ···, 01da |

FIG.13

| SESSION ID | RESERVATION ID | RELAY DEVICE ID | PARTICIPATING TERMINAL ID | DELAY TIME [ms] | DATE AND TIME WHEN DELAY INFORMATION IS RECEIVED |
|---|---|---|---|---|---|
| se01 | rsv05 | 111a | 01aa, 01cc | 200 | 2010.11.10. 14:00 |
| se02 | rsv06 | 111b | 01ab | 50 | 2010.11.10. 14:10 |
| se03 | null | 111d | 01ae, 01ca, 01dc | 400 | 2010.11.10. 14:20 |
| ··· | ··· | ··· | ··· | ··· | ··· |

FIG.14

| DELAY TIME [ms] | IMAGE QUALITY OF IMAGE DATA (QUALITY OF IMAGE) |
|---|---|
| 0 TO 100 | HIGH QUALITY |
| 100 TO 300 | INTERMEDIATE QUALITY |
| 300 TO 500 | LOW QUALITY |
| MORE THAN 500 | (INTERRUPTED) |

FIG.15

| TERMINAL ID | RELAY DEVICE ID |
|---|---|
| 01aa | 111a |
| 01ab | 111a |
| ... | ... |
| 01ba | 111b |
| 01bb | 111b |
| ... | ... |
| 01ca | 111c |
| 01cb | 111c |
| ... | ... |
| 01da | 111d |
| 01db | 111d |
| ... | ... |

FIG.16

| RESER-VATION ID | START DATE AND TIME | NAME | PARTICIPATING TERMINAL ID |
|---|---|---|---|
| rsv03 | 2010/06/12 15:00 | SECURITY CONFERENCE | 01aa, 01be, 01af |
| rsv04 | 2010/06/12 10:30 | STRATEGY MEETING | 01aa, 01ba |
| rsv05 | 2010/06/12 08:30 | NEW YORK OFFICE LIAISON | 01aa, 01ad, 01bc, 01cc |
| rsv06 | 2010/06/12 09:00 | JUNE PRODUCT PLANNING | 01ab, 01ba, 01ca |
| rsv07 | 2010/06/18 12:00 | APRIL BUSINESS REPORT | 01aa, 01ba, 01ca |
| ... | ... | ... | ... |

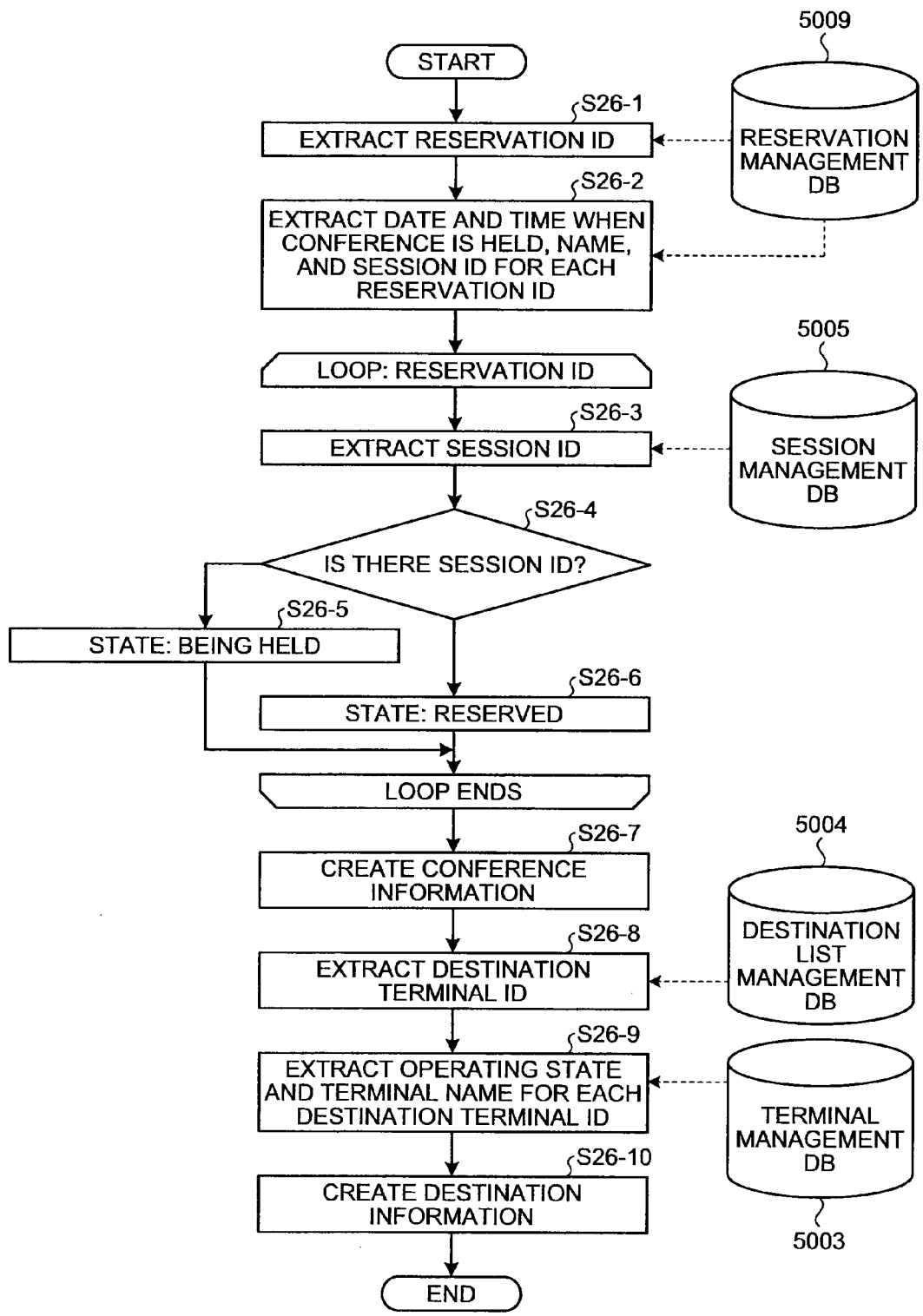

FIG.20A

| CONFERENCE ID | STATE | START TIME | NAME |
|---|---|---|---|
| rsv05 | BEING HELD | 08:30 | NEW YORK OFFICE LIAISON |
| rsv04 | RESERVED | 10:30 | STRATEGY MEETING |
| rsv03 | RESERVED | 15:00 | SECURITY CONFERENCE |

FIG.20B

| TERMINAL ID | STATE | NAME |
|---|---|---|
| 01ab | BUSY | AB TERMINAL IN TOKYO OFFICE IN JAPAN |
| ... | ... | ... |
| 01ba | BUSY | BA TERMINAL IN OSAKA OFFICE IN JAPAN |
| 01bb | ON LINE | BB TERMINAL IN OSAKA OFFICE IN JAPAN |
| ... | ... | ... |
| 01ca | OFF LINE | CA TERMINAL IN NEW YORK OFFICE IN USA |
| 01cb | BUSY | CB TERMINAL IN NEW YORK OFFICE IN USA |
| ... | ... | ... |
| 01da | BUSY | DA TERMINAL IN WASHINGTON, D.C. OFFICE IN USA |
| 01db | OFF LINE | DB TERMINAL IN WASHINGTON, D.C. OFFICE IN USA |
| ... | ... | ... |

| PARTICIPATING TERMINAL ID | STATE |
|---|---|
| 01aa | PARTICIPATION IS AVAILABLE |
| 01ad | PARTICIPATION IS AVAILABLE |
| 01bc | OFF LINE |
| 01cc | ENTERED |
| ... | ... | ized

TRANSMISSION MANAGEMENT SYSTEM, TRANSMISSION SYSTEM, AND TRANSMISSION MANAGEMENT SYSTEM PROGRAM

TECHNICAL FIELD

The present invention relates to a transmission management system that manages the communication state of a transmission terminal.

BACKGROUND ART

In recent years, a teleconference system has been in widespread use in which, for example, a teleconference is performed through a communication network, such as the Internet, in order to meet a demand for reducing expenses and time required for a business trip. In the teleconference system, when communication starts between a plurality of transmission terminals, such as teleconference terminals, content data, such as image data and voice data, is transmitted or received. In this way, the teleconference can be performed.

In addition, with the recent enrichment of a broadband environment, content data, such as high-quality image data or high-quality voice data, can be transmitted between a plurality of transmission terminals. In this way, it is easy to know the state of the other party in the teleconference and it has become possible to improve the fidelity of communication by a conversation.

In the teleconference system, a technique has been known in which, in the case where a teleconference through a reservation starts, a conference start time and conference information for specifying, for example, conference terminals are extracted from an electronic mail and various kinds of information required for holding the teleconference is accumulated (see Japanese Patent No. 4292544). In this way, the teleconference system can call the conference terminals participating in the teleconference at the conference start time and start the reserved conference.

However, in the conventional teleconference system, at a time when the reserved teleconference starts, it is difficult to check the communication state of another transmission terminal participating in the teleconference. Therefore, in the case where there is a request to start the reserved teleconference after a particular teleconference terminal participates in the teleconference, it is necessary to check the communication state of that particular teleconference terminal using different communication means, such as a telephone, and then start the conference. As a result, it takes a lot of time and effort.

DISCLOSURE OF INVENTION

The present invention provides a transmission management system that includes a communication management unit, a receiving unit, a reservation extracting unit, a determining unit, and a transmitting unit. When transmission terminals perform communication through a reservation, the communication management unit manages transmission terminal identification information used to identify each transmission terminal and reservation identification information used to identify the reservation so as to be associated with each other. When a first transmission terminal performs communication through a predetermined reservation, the receiving unit receives, from the first transmission terminal, a request to acquire a state of a second transmission terminal. The reservation extracting unit extracts the reservation identification information associated with transmission terminal identification information used to identify the second transmission terminal from the communication management unit when the receiving unit receives the request. The determining unit determines whether the reservation identified by the reservation identification information extracted by the reservation extracting unit matches the predetermined reservation. When the determining unit determines that the reservation matches the predetermined reservation, the transmitting unit transmits first state information indicating a first state of the second transmission terminal to the first transmission terminal, but when the determining unit determines that the reservation does not match the predetermined reservation, the transmitting unit transmits second state information indicating a second state of the second transmission terminal to the first transmission terminal.

BRIEF DESCRIPTION OF DRAWINGS

FIG. 9 is a conceptual diagram illustrating a relay device management table;

FIG. 10 is a conceptual diagram illustrating a terminal authentication management table;

FIG. 11 is a conceptual diagram illustrating a terminal management table;

FIG. 12 is a conceptual diagram illustrating a destination list management table;

FIG. 13 is a conceptual diagram illustrating a session management table;

FIG. 14 is a conceptual diagram illustrating a quality management table;

FIG. 15 is a conceptual diagram illustrating a relay device selection management table;

FIG. 16 is a conceptual diagram illustrating a reservation management table;

FIG. 19 is a flowchart illustrating a process of creating conference information and destination information;

FIG. 20A is a conceptual diagram illustrating an example of conference information;

FIG. 20B is a conceptual diagram illustrating an example of destination information;

BEST MODE(S) FOR CARRYING OUT THE INVENTION

Hereinafter, an embodiment of the invention will be described with reference to FIGS. 1 to 29.

Overall Structure of Embodiment

Figure 1:
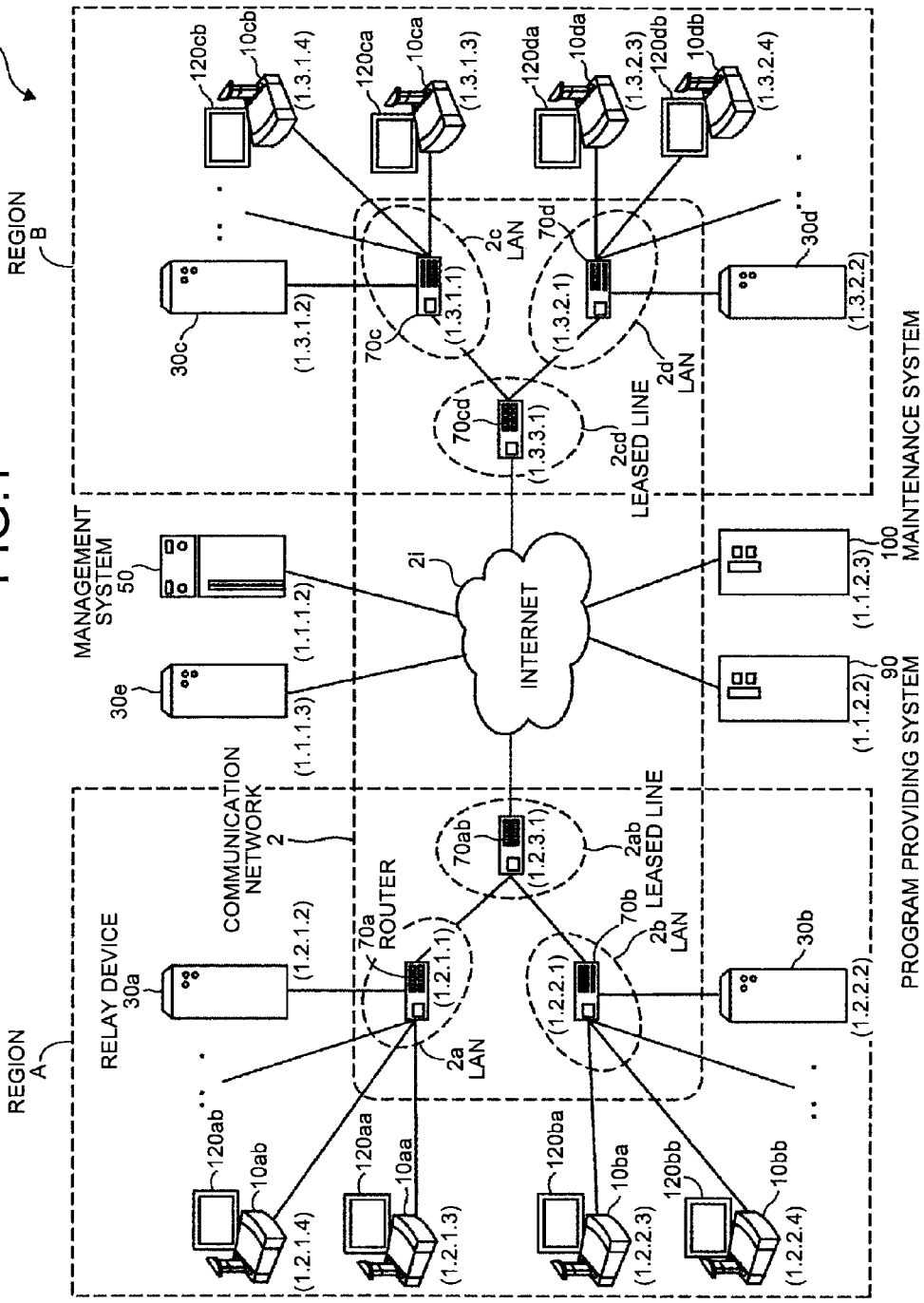
FIG. 1 is a diagram schematically illustrating a transmission system according to this embodiment.
Figure 2:
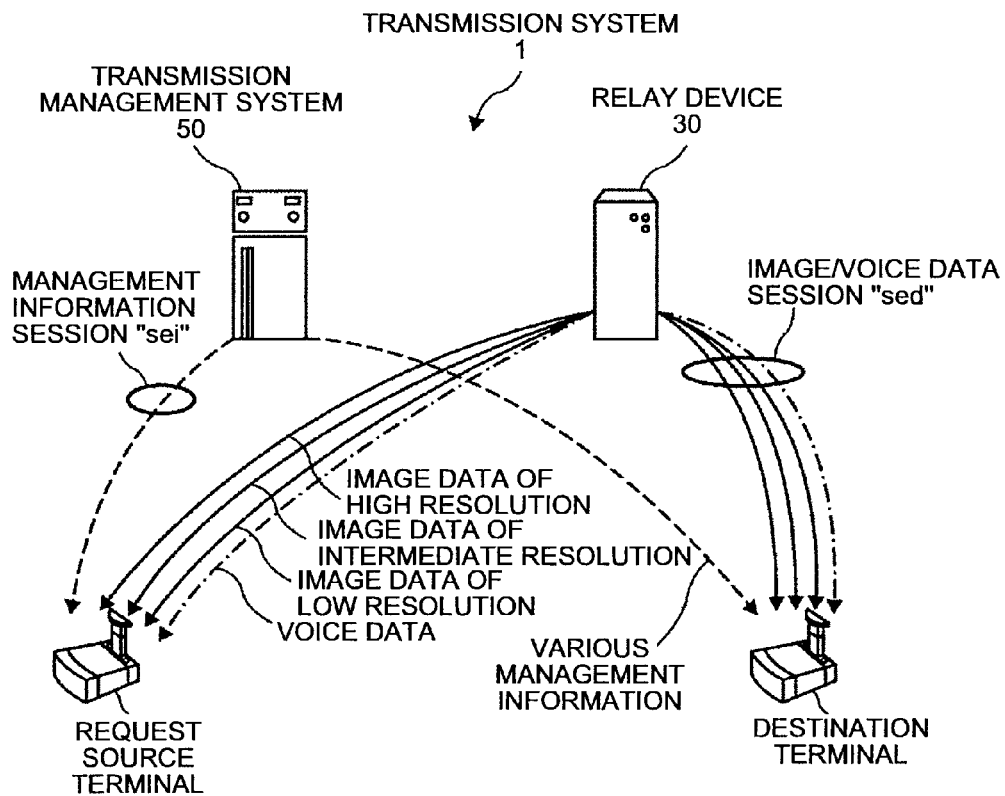
FIG. 2 is a conceptual diagram illustrating the transmission and reception states of image data, voice data, and various kinds of management information in the transmission system.
Figure 3A:
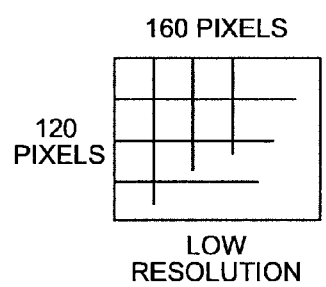
FIGS. 3A to 3C are conceptual diagrams illustrating the image quality of image data.
Figure 3B:
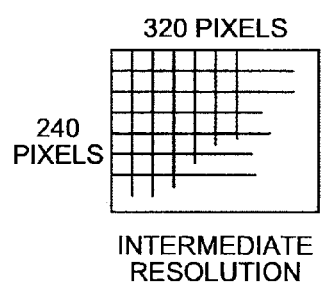
Figure 3C:
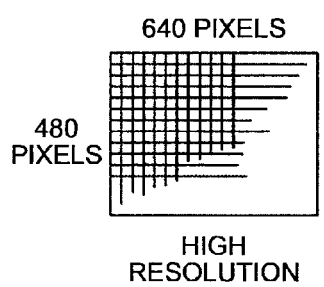

FIG. 1 is a diagram schematically illustrating a transmission system 1 according to an embodiment of the invention. FIG. 2 is a conceptual diagram illustrating the transmission and reception states of image data, voice data, and various kinds of management information in the transmission system. FIGS. 3A to 3C are conceptual diagrams illustrating the image quality of image data.

In the transmission system 1 according to this embodiment, it is assumed that, when the terminal ID of a terminal 10 participating in a session for which content data communication is performed is designated and a predetermined session is reserved, a virtual conference room is installed for each reservation (reservation ID (Identification)). In this case, it is assumed that each terminal enters the virtual conference room by designating the reservation ID and requesting the start of communication, and then, content data communication (conference) starts between the terminals in the same virtual conference room.

The transmission system includes a data providing system that transmits content data in one direction from a transmission terminal to another transmission terminal through a transmission management system or a communication system that transmits, for example, information or feelings between a plurality of transmission terminals through a transmission management system. The communication system is for transmitting, for example, information or feelings between a plurality of communication terminals (corresponding to "transmission terminals") through a communication management system (corresponding to a "transmission management system"). Examples of the communication system include a teleconference system, a video phone system, a voice conference system, a voice telephone system, and a Personal Computer (PC) screen sharing system.

In this embodiment, a teleconference system, a teleconference management system, and a teleconference terminal are respectively considered as an example of the communication system, an example of the communication management system, and an example of the communication terminal; and the transmission system, the transmission management system, and the transmission terminal will be described. That is, the transmission terminal and the transmission management system according to the embodiment may be applied to the communication system or the transmission system in addition to the teleconference system.

First, the transmission system 1 illustrated in FIG. 1 includes a plurality of transmission terminals (10*aa*, 10*ab*, ...), displays (120*aa*, 120*ab*, ...) for the transmission terminals (10*aa*, 10*ab*, ...), a plurality of relay devices (30*a*, 30*b*, 30*c*, 30*d*, and 30*e*), a transmission management system 50, a program providing system 90, and a maintenance system 100. The plurality of transmission terminals 10 transmit or receive image data and voice data as an example of content data.

In the following description, the "transmission terminal" is simply referred to as a "terminal" and the "transmission management system" is simply referred to as a "management system". Any one of the plurality of terminals (10*aa*, 10*ab*, ...) is referred to as a "terminal 10", any one of the plurality of displays (120*aa*, 120*ab*, ...) is referred to as a "display 120", and any one of the plurality of relay devices (30*a*, 30*b*, 30*c*, 30*d*, and 30*e*) is referred to as a "relay device 30". The terminal, which is a request source that requests the start of a teleconference, is referred to as a "request source terminal" and the terminal serving as a destination (relay destination), which is a request destination, is referred to as a "destination terminal".

As illustrated in FIG. 2, in the transmission system 1, a management information session "sei" for transmitting or receiving various kinds of management information through the management system 50 is established between the request source terminal and the destination terminal. In addition, four sessions for transmitting or receiving four types of data, that is, high-resolution image data, medium-resolution image data, low-resolution image data, and voice data through the relay device 30 are established between the request source terminal and the destination terminal. In this embodiment, the four sessions are referred to as image/voice data sessions "sed".

Next, the resolution of the image of the image data treated in this embodiment will be described. As illustrated in FIG. 3A, a low-resolution image has a size of 160 pixels by 120 pixels and serves as a base image. As illustrated in FIG. 3B, a medium-resolution image has a size of 320 pixels by 240 pixels. As illustrated in FIG. 3C, a high-resolution image has a size of 640 pixels by 480 pixels. Among those images, low-quality image data including only low-resolution image data, which is the base image, is relayed when a band path through which data is relayed is narrow. When the band is relatively wide, low-resolution image data, which is base image quality, and medium-quality image quality including medium-resolution image data are relayed. When the band is very wide, low-resolution image data, which is base image quality, medium-resolution image data, and high-quality image data including high-resolution image data are relayed.

The relay device 30 illustrated in FIG. 1 relays content data between the plurality of terminals 10. The management system 50 manages login authentication from the terminal 10, the communication state of the terminal 10, a destination list, and the communication state of the relay device 30 in an integrated manner. The image of the image data may be a moving picture or a still picture, or it may be both the moving picture and the still picture.

The terminal 10 transmits and receives, for example, image data and voice data in order to perform communication with another terminal 10. That is, the communication according to this embodiment includes the transmission and reception of voice data and the transmission and reception of image data. That is, the terminal 10 according to this embodiment transmits and receives image data and voice data. Alternatively, the terminal 10 may not transmit and receive the image data, but may transmit and receive the voice data.

In this embodiment, a case in which the image of the image data is a moving picture will be described, but the image may be a still picture as well as the moving picture. The image of the image data may include both the moving picture and the still picture. The relay device 30 relays the image data and the voice data between the plurality of terminals 10. The management system 50 manages the terminal 10 and the relay device 30 in an integrated manner.

A plurality of routers (70a, 70b, 70c, 70d, 70ab, and 70cd) selects paths most suitable for the image data and the voice data. In the following description, any one of the routers (70a, 70b, 70c, 70d, 70ab, and 70cd) is referred to as a "router 70".

The program providing system 90 includes a Hard Disk (HD) 204, which will be described below, stores therein a terminal program for causing the terminal 10 to implement various kinds of functions (or causing the terminal 10 to function as various kinds of units), and can transmit the terminal program to the terminal 10. The HD 204 of the program providing system 90 stores therein a relay device program for causing the relay device 30 to implement various kinds of functions (or causing the relay device 30 to function as various kinds of units) and can transmit the relay device program to the relay device 30. In addition, the HD 204 of the program providing system 90 stores therein a transmission management program for causing the management system 50 to implement various kinds of functions (or causing the management system 50 to function as various kinds of units) and can transmit the transmission management program to the management system 50.

The maintenance system 100 is a computer for maintaining, managing, or repairing at least one of the terminal 10, the relay device 30, the management system 50, and the program providing system 90. For example, when the maintenance system 100 is installed inside the country and the terminal 10, the relay device 30, the management system 50, or the program providing system 90 is installed outside the country, the maintenance system 100 remotely maintains, manages, and repairs at least one of the terminal 10, the relay device 30, the management system 50, and the program providing system 90 through a communication network 2. In addition, the maintenance system 100 performs a maintenance process, such as a process of managing the model number, serial number, sale destination, maintenance and inspection, or failure history of at least one of the terminal 10, the relay device 30, the management system 50, and the program providing system 90, without passing through the communication network 2.

The terminals (10aa, 10ab, . . . ), the relay device 30a, and the router 70a are connected by a LAN 2a such that they can communicate with each other. The terminals (10ba, 10bb, . . . ), the relay device 30b, and the router 70b are connected by a LAN 2b such that they can communicate with each other. The LAN 2a and the LAN 2b are connected by a leased line 2ab including a router 70ab such that they can communicate with each other and are constructed in a predetermined region A. For example, the region A is Japan, the LAN 2a is constructed in an office in Tokyo, and the LAN 2b is constructed in an office in Osaka.

The terminals (10ca, 10cb, . . . ), the relay device 30c, and the router 70c are connected by a LAN 2c such that they can communicate with each other. The terminals (10da, 10db, . . . ), the relay device 30d, and the router 70d are connected by a LAN 2d such that they can communicate with each other. The LAN 2c and the LAN 2d are connected by a leased line 2cd including a router 70cd such that they can communicate with each other and are constructed in a predetermined region B. For example, the region B is the USA, the LAN 2c is constructed in an office in New York, and the LAN 2d is constructed in an office in Washington, D.C. The region A and the region B are connected through the Internet 2i such that the routers (70ab and 70cd) can communicate with each other.

The management system 50 and the program providing system 90 are connected to the terminal 10 and the relay device 30 through the Internet 2i such that they can communicate with each other. The management system 50 and the program providing system 90 may be installed in the region A or the region B, or they may be installed in other regions.

The relay device 30e is connected to the terminal 10 through the communication network 2 such that they can communicate with each other. The relay device 30e is constantly operated and is installed in a region other than the region A and the region B such that it is less affected by the amount of communication in a local area of the region A or the region B. When the terminal 10 communicates with a terminal installed in another local area, the relay device 30e is used to relay content data. When the communication terminals communicate with each other in the same local area, the relay device 30e is used to relay communication data when the relay device installed in the local area is out of order.

In this embodiment, the communication network 2 according to this embodiment is constructed by the LAN 2a, the LAN 2b, the leased line 2ab, the Internet 2i, the leased line 2cd, the LAN 2c, and the LAN 2d. In the communication network 2, wireless communication, such as Wireless Fidelity (WiFI) or Bluetooth (registered trademark), may be performed as well as wired communication.

In FIG. 1, four sets of numbers given to the upper or lower side of each terminal 10, each relay device 30, the management system 50, each router 70, the program providing system 90, and the maintenance system 100 simply indicate an IP address in the general IPv4. For example, the IP address of the terminal 10aa is "1.2.1.3". Alternatively, IPv6 may be used, instead of IPv4. However, for simplicity of explanation, this embodiment will be described using IPv4.

Each terminal 10 may be used for communication between a plurality of offices, between different rooms in the same office, in the same room, between the inside and outside of the room, and between the outsides of the rooms. When each terminal 10 is used outdoor, wireless communication is performed by, for example, a mobile phone communication network.

Hardware Structure of Embodiment

Figure 29:
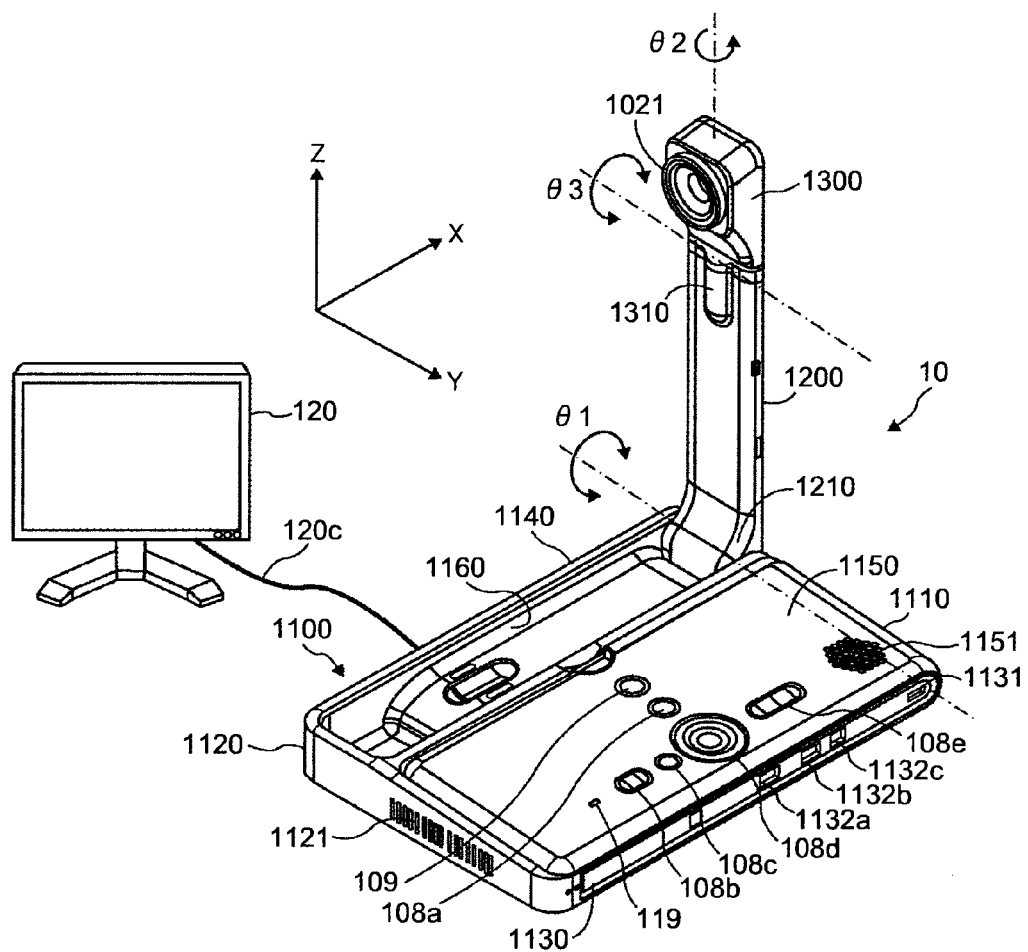
FIG. 29 is a diagram illustrating the outward appearance of the terminal according to this embodiment.

Next, the hardware structure of this embodiment will be described. FIG. 29 is a diagram illustrating the outward appearance of the terminal 10 according to an embodiment of the invention. In the following description, the longitudinal direction of the terminal 10 is the X-axis direction, a direction perpendicular to the X-axis direction in the horizontal plane is the Y-axis direction, and a direction (vertical direction) perpendicular to the X-axis direction and the Y-axis direction is the Z-axis direction.

As illustrated in FIG. 29, the terminal 10 includes a housing 1100, an arm 1200, and a camera housing 1300. Among them, an air intake surface (not illustrated) having a plurality of air inlets formed therein is provided on a front wall surface 1110 of the housing 1100 and an exhaust surface 1121 having a plurality of exhaust holes formed therein is provided on a rear wall surface 1120 of the housing 1100. In this way, a cooling fan provided in the housing 1100 can be driven to draw air from the rear side of the terminal 10 through the air intake surface (not illustrated) and discharge the air to the rear side of the terminal 10 through the exhaust surface 1121. A sound pickup hole 1131 is formed in a right wall surface 1130 of the housing 1100 and a built-in microphone 114, which will be described below, can pick up sounds, such as a voice and noise.

An operation panel 1150 is formed on the right wall surface 1130 of the housing 1100. The operation panel 1150 includes a plurality of operation buttons (108a to 108e), which will be described below, a power switch 109, which will be described below, an alarm lamp 119, which will be described below, and a sound output surface 1151 in which a plurality of voice output holes for transmitting an output sound from a built-in speaker 115, which will be described below, are formed. An accommodation portion 1160 serving as a concave portion for accommodating the arm 1200 and the camera housing 1300 is provided in a left wall surface 1140 of the housing 1100. A plurality of connection holes (1132a to 1132c) for electrically connecting a cable to an external device connection I/F 118, which will be described below, are provided in the right wall surface 1130 of the housing 1100. A connection hole (not illustrated) for electrically connecting a cable 120c for the display 120 to the external device connection I/F 118, which will be described below, is provided in the left wall surface 1140 of the housing 1100.

In the following description, when any one of the operation buttons (108a to 108e) is represented, an "operation button 108" is used, and when any one of the connection holes (1132a to 1132c) is represented, a "connection hole 1132" is used.

The arm 1200 is attached to the housing 1100 through a torque hinge 1210. The arm 1200 is configured so as to be rotatable with respect to the housing 1100 at a tilt angle θ1 of 135 degrees in the vertical direction. FIG. 29 illustrates a state in which the tilt angle θ1 is 90 degrees.

The camera housing 1300 is provided with a built-in camera 112, which will be described below, and can capture, for example, the images of the user, a document, and a room. In addition, the camera housing 1300 includes a torque hinge 1310 formed therein. The camera housing 1300 is attached to the arm 1200 through the torque hinge 1310. The camera housing 1300 is attached to the arm 1200 through the torque hinge 1310 and is configured so as to be rotatable with respect to the arm 1200 in all directions at a pan angle θ2 of 0 degrees, which is the state illustrated in FIG. 29, to ±180 degrees and at a tilt angle θ3 of ±45 degrees.

The outward appearance of each of the relay device 30, the management system 50, the program providing system 90, and the maintenance system 100 is the same as that of a general server computer and thus a description thereof will not be repeated.

Figure 4:
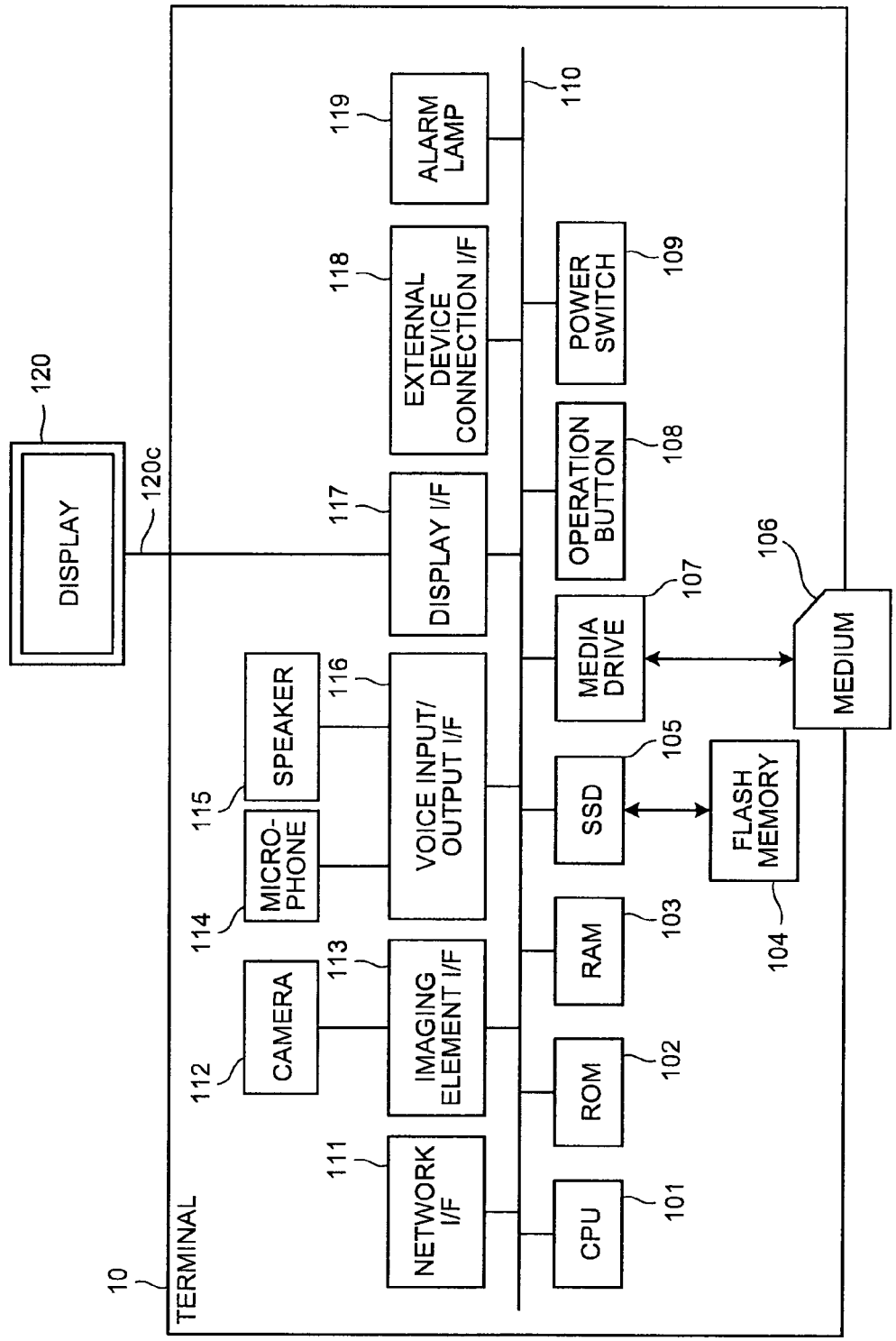
FIG. 4 is a diagram illustrating the hardware structure of the transmission terminal according to this embodiment.

FIG. 4 is a diagram illustrating the hardware structure of the terminal 10 according to an embodiment of the invention. As illustrated in FIG. 4, the terminal 10 according to this embodiment includes a Central Processing Unit (CPU) 101 that controls the overall operation of the terminal 10, a Read Only Memory (ROM) 102 that stores the terminal program, a Random Access Memory (RAM) 103 that is used as a work area of the CPU 101, a flash memory 104 that stores various kinds of data, such as image data or voice data, an Solid State Drive (SSD) 105 that reads or writes various kinds of data from or to the flash memory 104 under the control of the CPU 101, a media drive 107 that controls the reading or writing (storage) of data from or to a recording medium 106, such as a flash memory, an operation button 108 that is operated to select the destination of the terminal 10, a power switch 109 that turns on or off the terminal 10, and a network Interface (I/F) 111 configured to transmit data using the communication network 2, which will be described below.

The terminal 10 includes the built-in camera 112 that captures the image of an object and obtains image data under the control of the CPU 101, an imaging element I/F 113 that controls the driving of the camera 112, the built-in microphone 114 that inputs a voice, the built-in speaker 115 that outputs a voice, a voice input/output I/F 116 that processes the input and output of voice signals between the microphone 114 and the speaker 115 under the control of the CPU 101, a display I/F 117 that transmits image data to an external display 120 under the control of the CPU 101, an external device connection I/F 118 configured to connect various kinds of external devices, an alarm lamp 119 that notifies of an error in various kinds of functions of the terminal 10, and a bus line 110, such as an address bus or a data bus configured to electrically connect the above-mentioned components as illustrated in FIG. 4.

The display 120 is a liquid crystal or organic EL display unit that displays the image of an object or operating icons. In addition, the display 120 is connected to the display I/F 117 by a cable 120c. The cable 120c may be a cable for analog RGB (VGA) signals, a cable for a component video, or a cable for a High-Definition Multimedia Interface (HDMI) or Digital Video Interactive (DVI) signal.

The camera 112 includes a lens and a solid-state imaging element that converts light into charge to obtain a computerized object image (video). For example, a Complementary Metal Oxide Semiconductor (CMOS) or a Charge Coupled Device (CCD) is used as the solid-state imaging element.

An external device, such as an external camera, an external microphone, or an external speaker, can be electrically connected to the external device connection I/F 118 by, for example, a Universal Serial Bus (USB) cable inserted into the connection hole 1132 of the housing 1100 illustrated in FIG. 29. When the external camera is connected, the external camera is driven prior to the built-in camera 112 under the control of the CPU 101. Similarly, when the external microphone is connected or when the external speaker is connected, the external microphone or the external speaker is driven prior to the built-in microphone 114 or the built-in speaker 115 under the control of the CPU 101.

The recording medium 106 is configured so as to be removable from the terminal 10. The invention is not limited to the flash memory 104, but any non-volatile memory may be used as long as data can be read from or written to the non-volatile memory under the control of the CPU 101. For example, an Electrically Erasable and Programmable ROM (EEPROM) may be used.

The terminal program may be recorded as a file of an installable format or an executable format on a computer-readable recording medium (for example, the recording medium 106) and distributed. In addition, the terminal program may be stored in the ROM 102, not the flash memory 104.

Figure 5:
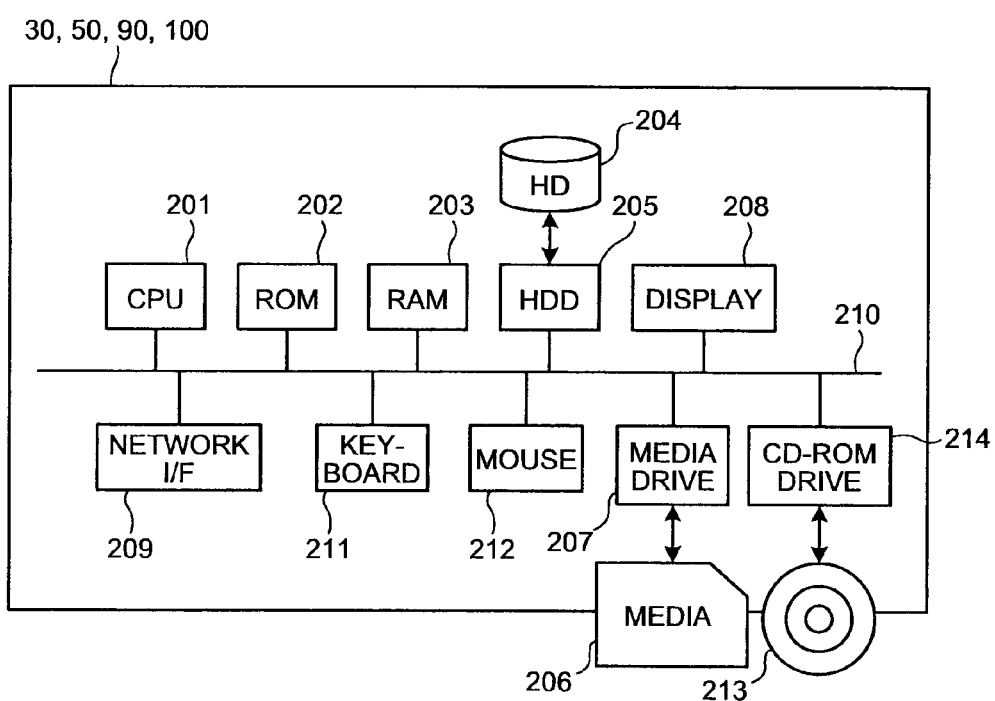
FIG. 5 is a diagram illustrating the hardware structure of a transmission management system, a relay device, or a program providing system according to this embodiment.

FIG. 5 is a diagram illustrating the hardware structure of the management system according to this embodiment of the invention. The management system 50 includes a CPU 201 that controls the overall operation of the management system 50, a ROM 202 that stores programs, such as IPL used to drive the CPU 201, a RAM 203 that is used as a work area of the CPU 201, an HD 204 that stores various kinds of data, such as transmission management programs, and a Hard Disk Drive (HDD) 205 that controls the reading or writing of various kinds of data from or to the HD 204 under the control of the CPU 201, a media drive 207 that controls the reading or writing (storage) of data from or to a recording medium 206, such as a flash memory, a display 208 that displays various kinds of information, such as a cursor, a menu, a window, characters, or images, a network I/F 209 configured to transmit data using the communication network 2, a keyboard 211 including a plurality of keys for inputting, for example, characters, numbers, and various kinds of instructions, a mouse 212 for, for example, selecting or executing various kinds of instructions, selecting a processing target, and moving a cursor, a CD-ROM drive 214 that controls the reading or writing of various kinds of data from or to a Compact Disc Read Only Memory (CD-ROM) 213 which is an example of a removable recording medium, and a bus line 210, such as an address bus or a data bus configured to electrically connect the above-mentioned components as illustrated in FIG. 5.

The transmission management program may be recorded as a file of an installable format or an executable format on a computer-readable recording medium, such as the recording medium 206 or the CD-ROM 213, and then distributed. In addition, the transmission management program may be stored in the ROM 202, not the HD 204.

The relay device 30 has the same hardware structure as the management system 50 and a description thereof will not be repeated. However, the HD 204 stores a relay device program for controlling the relay device 30. In this case, the relay device program may be recorded as a file of an installable format or an executable format on a computer-readable recording medium, such as the recording medium 206 or the CD-ROM 213, and distributed. In addition, the relay device program may be stored in the ROM 202, not the HD 204.

The program providing system 90 and the maintenance system 100 have the same hardware structure as the management system 50 and a description thereof will not be repeated. However, the HD 204 stores a program providing program for controlling the program providing system 90 or a maintenance program for controlling the maintenance system 100. In this case, these programs may be recorded as a file of an installable format or an executable format on a computer-readable recording medium, such as the recording medium 206 or the CD-ROM 213, and then distributed. In addition, these programs may be stored in the ROM 202, not the HD 204.

For example, a computer-readable recording medium, such as a Compact Disc Recordable (CD-R), a Digital Versatile Disk (DVD), or a Blu-ray disc, may be used as the removable recording medium. These programs may be recorded on the computer-readable recording medium and then provided.

Functional Structure of Embodiment

Figure 6:
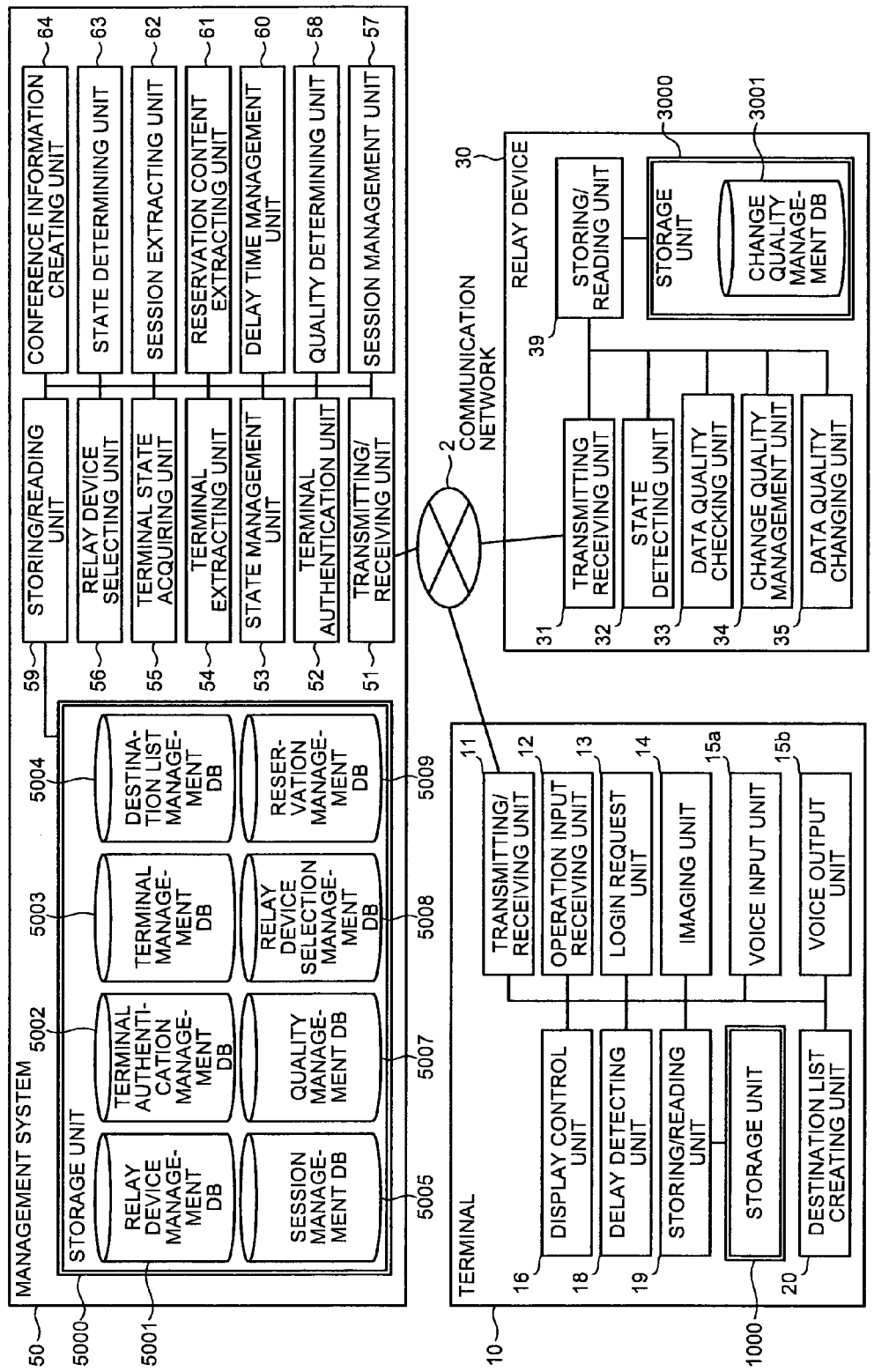
FIG. 6 is a functional block diagram illustrating each terminal, each device, and each system forming the transmission system according to this embodiment.

Next, the functional structure of this embodiment will be described. FIG. 6 is a functional block diagram illustrating each of the terminals, the devices, and the systems forming the transmission system 1 according to this embodiment. In FIG. 6, the terminal 10, the relay device 30, and the management system 50 are connected such that they can perform data communication therebetween through the communication network 2. The program providing system 90 and the maintenance system 100 illustrated in FIG. 1 are not directly related to the communication of a teleconference and thus are not illustrated in FIG. 6.

Functional Structure of Terminal

The terminal 10 includes a transmitting/receiving unit 11, an operation input receiving unit 12, a login request unit 13, an imaging unit 14, a voice input unit 15*a*, a voice output unit 15*b*, a display control unit 16, a delay detecting unit 18, a storing/reading unit 19, and a destination list creating unit 20. Each of those units is a function or a functioning unit implemented by operating any of the components illustrated in FIG. 4 in response to commands from the CPU 101 according to the terminal program which is expanded from the flash memory 104 onto the RAM 103. In addition, the terminal 10 includes a storage unit 1000 constructed by the RAM 103 illustrated in FIG. 4 and the flash memory 104 illustrated in FIG. 4.

Each Function Structure of Terminal

Next, each functional structure of the terminal 10 will be described with reference to FIGS. 4 and 6. Next, in the description of each functional structure of the terminal 10, a relation with main components configured to implement each functional structure of the terminal 10 among the components illustrated in FIG. 4 will be described.

The transmitting/receiving unit 11 of the terminal 10 illustrated in FIG. 6 is implemented by a command from the CPU 101 illustrated in FIG. 4 and the network I/F 111 illustrated in FIG. 4 and transmits or receives various kinds of data (or information) to or from another terminal, another device, or another system through the communication network 2. The transmitting/receiving unit 11 starts to receive each piece of state information indicating the state of each of the other terminals, which are destination candidates, from the management system 50 before it starts to communicate with the destination terminal 10, which is a desired destination. The state information indicates the operating state (state indicating whether the terminal is on-line or off-line) of each terminal 10, as well as indicates detailed states indicating whether communication is available even when the terminal is on-line, whether the terminal is communicating, and whether a user is away from the terminal. In addition, the state information indicates various states, such as a state in which the cable 120*c* is disconnected from the terminal 10, a state in which a voice is output, but no image is output, and a state (MUTE) in which a voice is not output, in addition to the operating state of each terminal 10. Next, an example in which the state information indicates the operating state will be described.

The operation input receiving unit 12 is implemented by a command from the CPU 101 illustrated in FIG. 4, and the operation button 108 and the power switch 109 illustrated in FIG. 4 and receives various kinds of inputs from the user. For example, when the user turns on the power switch 109 illustrated in FIG. 4, the operation input receiving unit 12 illustrated in FIG. 6 receives the power-on signal and turns on a power supply.

The login request unit 13 is implemented by a command from the CPU 101 illustrated in FIG. 4. Upon receiving the power-on signal, the login request unit 13 automatically transmits login request information for requesting a login and the IP address of the terminal 10 (request source terminal), which is a request source, at the present moment from the transmitting/receiving unit 11 to the management system 50 through the communication network 2. When the user turns off the power switch 109, the transmitting/receiving unit 11 transmits state information indicating that power has been turned off to the management system 50, and then, the operation input receiving unit 12 completely turns off the power supply. In this way, the management system 50 can know that the terminal 10 is turned off.

The imaging unit 14 is implemented by a command from the CPU 101 illustrated in FIG. 4, and the camera 112 and the imaging element I/F 113 illustrated in FIG. 4, captures the image of an object, and outputs the captured image data.

The voice input unit 15*a* is implemented by a command from the CPU 101 illustrated in FIG. 4 and the voice input/output I/F 116 illustrated in FIG. 4. After the microphone 114 converts the voice of the user into a voice signal, the voice input unit 15*a* receives voice data related to the voice signal. The voice output unit 15*b* is implemented by a command from the CPU 101 illustrated in FIG. 4 and the voice input/output I/F 116 illustrated in FIG. 4, and outputs the voice signal related to the voice data to the speaker, so that the speaker 115 outputs a voice.

The display control unit 16 is implemented by a command from the CPU 101 illustrated in FIG. 4 and the display I/F 117 illustrated in FIG. 4. The display control unit 16 controls a process of combining the received pieces of image data with different resolutions and transmitting the combined image data to the display 120.

The display control unit 16 can transmit information about a destination list and a conference list received from the management system 50 to the display 120, so that the destination list and the conference list are displayed on the display 120. In this way, the display control unit 16 displays, for example, a destination list frame 311-1 illustrated in FIG. 21 on the display 120. Each destination name, such as a destination name "AB terminal in Tokyo office in Japan" 311-2 is displayed in the destination list frame 311-1 and icons (311-3a, 311-3b, and 311-3c) indicating the states related to the state information are displayed for each destination name. Among the icons, the icon 311-3a indicates that a terminal, which is one of the destination candidates, is on-line and is in a standby state, and thus the communication with the terminal is available. The icon 311-3b indicates that a terminal, which is one of the destination candidates, is off-line and thus the communication with the terminal is unavailable. The icon 311-3c indicates that a terminal, which is one of the destination candidates, is communicating with another terminal and thus it is possible to participate in the communication. In addition, each conference start time and conference name, such as a conference start time and conference name "08:30 New York Office . . . " 314, is displayed in the destination list frame 311-1 and icons (311-4a and 311-4b) indicating states related to the state information are displayed for each conference name. Of the icons, the icon 311-4a indicates that a conference is reserved. The icon 311-4b indicates that a conference is being held. A scroll bar 311-4 is displayed on the right side of the destination list frame 311-1, and an icon with a triangular or inverted triangular shape is selected to display icons indicating destination names and states of the destination candidates which are not displayed in FIG. 21.

The delay detecting unit 18 is implemented by a command from the CPU 101 illustrated in FIG. 4 and detects the delay time (ms) of the image data or the voice data transmitted from another terminal 10 through the relay device 30.

The storing/reading unit 19 is implemented by a command from the CPU 101 illustrated in FIG. 4 and the SSD 105 illustrated in FIG. 4, or it is implemented by a command from the CPU 101. The storing/reading unit 19 performs a process of storing various kinds of data in the storage unit 1000 and a process of reading various kinds of data stored in the storage unit 1000. The storage unit 1000 stores therein, for example, a terminal Identification (ID) for identifying the terminal 10 and passwords. In addition, the image data and the voice data received during communication with the destination terminal are overwritten in the storage unit 1000 whenever the image data and the voice data are received. Among them, an image is displayed on the display 120 on the basis of the image data before overwriting, and a voice is output from the speaker 115 on the basis of the voice data before overwriting. The terminal ID and a relay device ID, which will be described below, according to this embodiment indicate identification information, such as languages, characters, codes, or various kinds of signs used to uniquely identify the terminal 10 and the relay device 30, respectively. In addition, the terminal ID and the relay device ID may be identification information, which is a combination of at least two of the language, characters, codes, and various kinds of signs.

Figure 21:
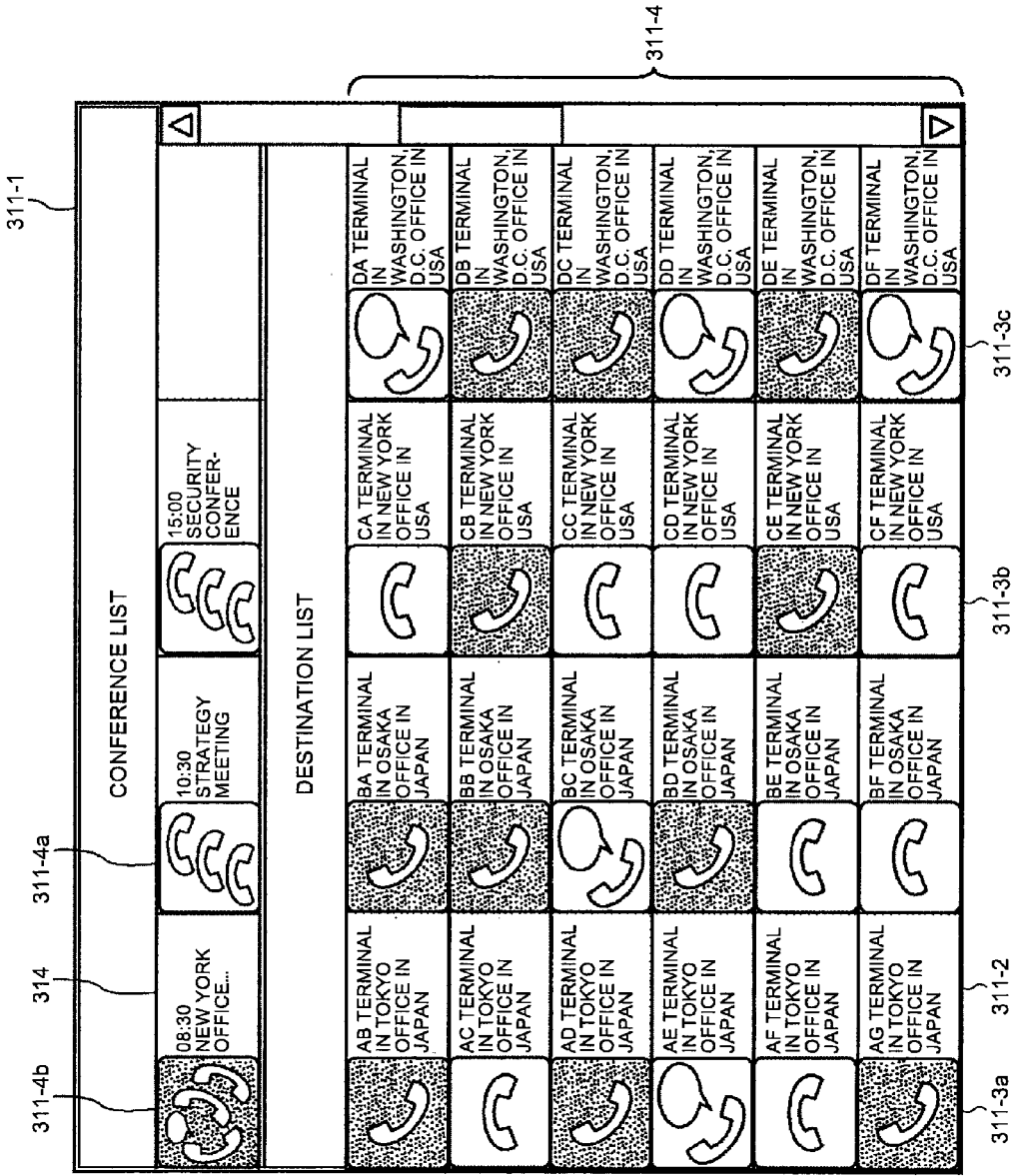
FIG. 21 is a conceptual diagram illustrating a destination list according to this embodiment.

The destination list creating unit 20 creates and updates the destination list in which the states of the destination candidates are represented by icons as illustrated in FIG. 21, on the basis of conference list information, which will be described below, destination list information, and the state information of each terminal 10, which is each destination candidate, which are received from the management system 50.

Functional Structure of Relay Device

The relay device 30 includes a transmitting/receiving unit 31, a state detecting unit 32, a data quality checking unit 33, a change quality management unit 34, a data quality changing unit 35, and a storing/reading unit 39. Each of those units is a function or a functioning unit implemented by operating any of the components illustrated in FIG. 5 in response to a command from the CPU 201 according to the relay device program which is expanded from the HD 204 to the RAM 203. In addition, the relay device 30 includes a storage unit 3000 that is constructed by the RAM 203 illustrated in FIG. 5 and/or the HD 204 illustrated in FIG. 5.

Change Quality Management Table

Figures 7, 8:
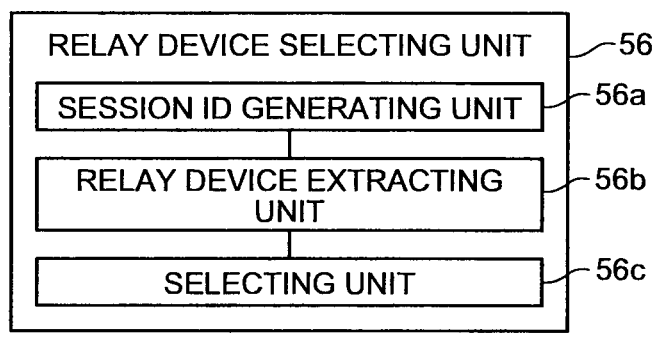
FIG. 7 is a functional block diagram illustrating the detailed structure of a relay device selecting unit 56 illustrated in FIG. 6.
FIG. 8 is a conceptual diagram illustrating a change quality management table.

A change quality management Data Base (DB) 3001 including a change quality management table illustrated in FIG. 8 is constructed in the storage unit 3000. FIG. 8 is a conceptual diagram illustrating the change quality management table. In the change quality management table, the IP address of the terminal 10, which is the relay destination (address) of image data, and the image quality of the image data to be relayed to the relay destination by the relay device 30 are associated with each other and managed.

Each Functional Unit of Relay Device

Next, each functional structure of the relay device 30 will be described in detail. In the description of each functional structure of the relay device 30, a relation with the main components configured to implement each functional structure of the relay device 30 among the components illustrated in FIG. 5 will also be described.

The transmitting/receiving unit 31 of the relay device 30 illustrated in FIG. 6 is implemented by a command from the CPU 201 illustrated in FIG. 5 and the network I/F 209 illustrated in FIG. 5 and transmits or receives various kinds of data (or information) to or from another terminal, another device, and another system through the communication network 2.

The state detecting unit 32 is implemented by a command from the CPU 201 illustrated in FIG. 5 and detects the operating state of the relay device 30 including the state detecting unit 32. Examples of the operating state include an "on-line" state, an "off-line" state, a "busy" state, and a "pause" state.

The data quality checking unit 33 is implemented by a command from the CPU 201 illustrated in FIG. 5, searches the change quality management DB 3001 (see FIG. 8) using the IP address of the destination terminal as a search key, and extracts the image quality of the corresponding relayed image data, thereby checking the image quality of the relayed image data.

The change quality management unit 34 is implemented by a command from the CPU 201 illustrated in FIG. 5 and changes the content of the change quality management DB 3001 on the basis of quality information, which will be described below, transmitted from the management system 50. For example, during a teleconference between a request source terminal (terminal 10aa) with a terminal ID "01aa" and a destination terminal (terminal 10db) with a terminal ID "01db" by the transmission and reception of high-quality image data, when a request source terminal (terminal 10bb)

and a destination terminal (terminal 10ca) start to participate in another teleconference through the communication network 2, which results in a delay in the reception of image data in the destination terminal (terminal 10db), the relay device 30 reduces the image quality of the image data which is currently relayed from a high level to a medium level. In this case, the content of the change quality management DB 3001 is changed such that the image quality of the image data to be relayed by the relay device 30 is reduced from a high level to a medium level, on the basis of the quality information indicating the medium image quality.

The data quality changing unit 35 is implemented by a command from the CPU 201 illustrated in FIG. 5 and changes the image quality of the image data transmitted from a transmission source terminal on the basis of the changed content of the change quality management DB 3001.

The storing/reading unit 39 is implemented by a command from the CPU 201 illustrated in FIG. 5 and the HDD 205 illustrated in FIG. 5 and performs a process of storing various kinds of data in the storage unit 3000 or a process of reading various kinds of data stored in the storage unit 3000.

Functional Structure of Management System

The management system 50 includes a transmitting/receiving unit 51, a terminal authentication unit 52, a state management unit 53, a terminal extracting unit 54, a terminal state acquiring unit 55, a relay device selecting unit 56, a session management unit 57, a quality determining unit 58, a storing/reading unit 59, a delay time management unit 60, a reservation content extracting unit 61, a session extracting unit 62, a state determining unit 63, and a conference information creating unit 64. Each of those units is a function or a functioning unit implemented by operating any of the components illustrated in FIG. 5 in response to commands from the CPU 201 according to the management system program which is expanded from the HD 204 onto the RAM 203. In addition, the management system 50 includes a storage unit 5000 (which is illustrated or referred to as a non-volatile storage unit 5000 in some cases) constructed by the HD 204 illustrated in FIG. 5. The storage unit 5000 stores therein the destination list frame 311-1 illustrated in FIG. 21.

Relay Device Management Table

A relay device management DB 5001 including a relay device management table illustrated in FIG. 9 is constructed in the storage unit 5000. FIG. 9 is a conceptual diagram illustrating the relay device management table. In the relay device management table, the operating state of each relay device 30, the date and time when the management system 50 receives state information including the operating state, the IP address of the relay device 30, and the maximum data transmission rate (Mbps) of the relay device 30 are managed so as to be associated with the relay device ID of each relay device 30. For example, the relay device management table illustrated in FIG. 9 shows that the operating state of a relay device 30a with a relay device ID "111a" is "on-line", the date and time when the management system 50 receives state information is "2010.11.10. 13:00", the IP address of the relay device 30a is "1.2.1.2", the maximum data transmission speed of the relay device 30a is 100 Mbps.

Terminal Authentication Management Table

In addition, a terminal authentication management DB 5002 including a terminal authentication management table illustrated in FIG. 10 is constructed in the storage unit 5000. FIG. 10 is a conceptual diagram illustrating the terminal authentication management table. In the terminal authentication management table, each password is associated with each of the terminal IDs of all the terminals 10 managed by the management system 50 and is managed. For example, the terminal authentication management table illustrated in FIG. 10 shows that the terminal ID of the terminal 10aa is "01aa" and the password is "aaaa".

Terminal Management Table

In addition, a terminal management DB 5003 including a terminal management table illustrated in FIG. 11 is constructed in the storage unit 5000. FIG. 11 is a conceptual diagram illustrating the terminal management table. In the terminal management table, a destination name of each destination terminal 10, the operating state of each destination terminal 10, the date and time when the management system 50 receives login request information, which will be described below, and the IP address of each destination terminal 10 are managed so as to be associated with the terminal ID of each terminal 10. For example, the terminal management table illustrated in FIG. 11 shows that the terminal 10aa with a terminal ID "01aa" has a terminal name "AA terminal in Tokyo office in Japan", the operating state is "on-line (communication is available)", the date and time when the management system 50 receives the login request information is "2010.11.10. 13:40", and the IP address of the terminal 10aa is "1.2.1.3".

Destination List Management Table

A destination list management DB 5004 including a destination list management table illustrated in FIG. 12 is constructed in the storage unit 5000. FIG. 12 is a conceptual diagram illustrating the destination list management table. In the destination list management table, all the terminal IDs of the destination terminals which are registered as the candidates of the destination terminal are managed so as to be associated with the terminal ID of a request source terminal that requests the start of communication in the teleconference. For example, the destination list management table illustrated in FIG. 12 shows that the candidates of the destination terminals which can be requested by a request source terminal (terminal 10aa) with a terminal ID "01aa" to start communication in the teleconference are the terminal 10ab with a terminal ID "01ab", the terminal 10ba with a terminal ID "01ba", and the terminal 10bb with a terminal ID "01bb". The candidates of the destination terminals are added or removed by the management system 50 in response to an addition or removal request from an arbitrary request source terminal. In this way, the candidates of the destination terminals are updated.

Session Management Table

In addition, a session management DB 5005 including a session management table illustrated in FIG. 13 is constructed in the storage unit 5000. FIG. 13 is a conceptual diagram illustrating the session management table. In the session management table, a reservation ID for identifying a reservation when communication is performed between the terminals on the basis of the reservation, a relay device ID for identifying the relay device 30 used to relay image data and voice data, a terminal ID (participating terminal ID) for identifying the terminal 10 (participating terminal) that participates in the session, a reception delay time (ms) when the destination terminal receives image data, and the date and time when the management system 50 receives delay information including the delay time from the destination terminal are managed so as to be associated with each session ID for identifying the session for which content data is transmitted between the terminals.

For example, the session management table illustrated in FIG. 13 shows that the reservation ID corresponding to a session ID "se01" is "rsv05", the relay device 30a (relay device ID "111a") relays image data and voice data between participating terminals (terminals 01aa and 01cc) during the session, and the delay time of the image data at "2010.11.10. 14:00" is 200 (ms). When a teleconference is performed between two terminals 10, the date and time when the delay information is received may be managed on the basis of the delay information transmitted from the destination terminal or the request source terminal. However, when a teleconference is performed among three or more terminals 10, the date and time when the delay information is received may be managed on the basis of the delay information transmitted from the terminal 10 that receives image data and voice data. When the reservation ID is "null (in a state in which no data is included)", the session means a session which starts without a reservation (ad-hoc conference).

Quality Management Table

In addition, a quality management DB 5007 including a quality management table illustrated in FIG. 14 is constructed in the storage unit 5000. FIG. 14 is a conceptual diagram illustrating the quality management table. In the quality management table, the delay time of image data and the image quality (image quality) of the image data are managed so as to be associated with each other such that, as the length of the delay time (ms) of the image data in the request source terminal or the destination terminal increases, the image quality of the image data relayed by the relay device 30 is reduced.

Relay Device Selection Management Table

A relay device selection management DB 5008 including a relay device selection management table illustrated in FIG. 15 is also constructed in the storage unit 5000. FIG. 15 is a conceptual diagram illustrating the relay device selection management table. In the relay device selection management table, the relay device ID of the relay device 30 used to relay image data and voice data is associated with each of the terminal IDs of all the terminals 10 managed by the management system 50.

Reservation Management Table

In addition, a reservation management DB 5009 including a reservation management table illustrated in FIG. 16 is constructed in the storage unit 5000. FIG. 16 is a conceptual diagram illustrating the reservation management table. In the reservation management table, the date and time of start of a session, the date and time of end of the session, the name of the session, and the terminal ID (participating terminal ID) of the terminal participating in the reserved session are managed so as to be associated with each reservation ID for identifying the session for which content data is transmitted between the reserved terminals. For example, the reservation management table illustrated in FIG. 16 shows that the date and time when the session reserved with a reservation ID "rsv03" starts is "2010.11.10. 15:00", the date and time when the session ends is "2010.11.10. 17:00", the name and the session is a "security conference", and the terminal IDs of the participating terminals participating in the reserved session are "01aa, 01be, and 01af".

Each Functional Structure of Management System

Next, each functional structure of the management system 50 will be described. In the description of each functional structure of the management system 50, a relation with the main components configured to implement each functional structure of the management system 50 among the components illustrated in FIG. 5 will also be described.

The transmitting/receiving unit 51 is implemented by a command from the CPU 201 illustrated in FIG. 5 and the network I/F 209 illustrated in FIG. 5 and transmits or receives various kinds of data (or information) to or from another terminal, another device, or another system through the communication network 2.

The terminal authentication unit 52 is implemented by a command from the CPU 201 illustrated in FIG. 5. The terminal authentication unit 52 searches the terminal authentication management table (see FIG. 10) of the terminal authentication management DB 5002 in the storage unit 5000 using, as a search key, the terminal ID and the password included in the login request information which is received through the transmitting/receiving unit 51, and determines whether the same terminal ID and password are managed by the terminal authentication management DB 5002, thereby performing terminal authentication.

The state management unit 53 is implemented by a command from the CPU 201 illustrated in FIG. 5. In order to manage the operating state of the request source terminal, the state management unit 53 stores the terminal ID of the request source terminal that requests a login, the operating state of the request source terminal, the date and time when the management system 50 receives login request information, and the IP address of the request source terminal in the terminal management table (see FIG. 11) of the terminal management DB 5003 so as to be associated with each other and manages them. In addition, the state management unit 53 changes the operating state of the terminal management table from an on-line state to an off-line state on the basis of the state information indicating that power is turned off transmitted from the terminal 10 when the user changes the state of the power switch 109 of the terminal 10 from an on state to an off state.

The terminal extracting unit 54 is implemented by a command from the CPU 201 illustrated in FIG. 5, searches the address management table (see FIG. 12) of the destination list management DB 5004 using the terminal ID of the request source terminal that requests a login as a key, and reads the terminal IDs of the candidates of the destination terminals capable of communicating with the request source terminal, thereby extracting the terminal IDs. In addition, the terminal extracting unit 54 searches the address management table of the destination list management DB 5004 using the terminal ID of the request source terminal that requests a login as a key and extracts the terminal ID of another request source terminal in which the terminal ID of the request source terminal registered as the candidate of the destination terminal.

The terminal state acquiring unit 55 is implemented by a command from the CPU 201 illustrated in FIG. 5, searches the terminal management table (see FIG. 11) of the terminal management DB 5003 using the terminal ID of the candidate of the destination terminal extracted by the terminal extracting unit 54 as a search key, and reads the operating state for each terminal ID extracted by the terminal extracting unit 54. In this way, the terminal state acquiring unit 55 can acquire the operating state of the candidate of the destination terminal capable of communicating with the request source terminal that requests a login. In addition, the terminal state acquiring unit 55 searches the terminal management table of the terminal management DB 5003 using, as a search key, the terminal ID extracted by the terminal extracting unit 54 and acquires the operating state of the request source terminal that requests a login.

The relay device selecting unit 56 is implemented by a command from the CPU 201 illustrated in FIG. 5 and selects the relay device 30 used to relay image data and voice data for each session for which content data is transmitted between the terminals. Therefore, the relay device selecting unit 56 implements a session ID generating unit 56a, a relay device extracting unit 56b, and a selecting unit 56c illustrated in FIG. 7 in response to commands from the CPU 201 illustrated in FIG. 5. FIG. 7 is a functional block diagram illustrating the details of the relay device selecting unit 56 illustrated in FIG. 6.

Among those units, the session ID generating unit 56a generates a session ID for identifying the session for which content data is transmitted between the terminals. The relay device extracting unit 56b searches the relay device selection management table (see FIG. 15) of the relay device selection management DB 5008 on the basis of the terminal ID of the request source terminal and the terminal ID of the destination terminal in the start request information transmitted from the request source terminal, and extracts each corresponding relay device ID. The selecting unit 56c selects the relay device ID of the relay device 30 whose operating state is "on-line" among the relay devices 30 managed by the relay device management table (see FIG. 9) of the relay device management DB 5001, thereby selecting the relay device 30.

The session management unit 57 stores the session ID generated by the session ID generating unit 56a and the terminal ID of the participating terminal in the session management table (see FIG. 6) of the session management DB 5005 in the storage unit 5000 so as to be associated with each other and manages them. In addition, the session management unit 57 stores the relay device ID of the relay device 30 selected by the selecting unit 56c for each session ID in the session management DB 5005 and manages the relay device ID.

The quality determining unit 58 searches the quality management table (see FIG. 14) of the quality management DB 5007 using the delay time as a search key and extracts the image quality of the corresponding image data, thereby determining the image quality of the image data relayed by the relay device 30.

The storing/reading unit 59 is implemented by a command from the CPU 201 illustrated in FIG. 5 and the HDD 205 illustrated in FIG. 5 and performs a process of storing various kinds of data in the storage unit 5000 or a process of reading various kinds of data stored in the storage unit 5000.

The delay time management unit 60 is implemented by a command from the CPU 201 illustrated in FIG. 5, searches the terminal management table (see FIG. 11) of the terminal management DB 5003 using the IP address of the destination terminal as a search key, and extracts the corresponding terminal ID. In addition, the delay time management unit 60 stores the delay time indicated by the delay information in a delay time field of a record including the extracted terminal ID in the session management table (see FIG. 13) and manages the delay time.

The reservation content extracting unit 61 searches the reservation management table (see FIG. 16) of the reservation management DB 5009 using the terminal ID of the request source terminal that requests a login as a search key and extracts the reservation ID. In addition, the reservation content extracting unit 61 searches the reservation management table using the reservation ID as a search key, and extracts the start date and time and the name for each extracted reservation ID. Furthermore, the reservation content extracting unit 61 searches the reservation management table using the reservation ID in detailed conference/destination request information transmitted from the request source terminal (terminal 10aa) as a search key, and extracts the terminal ID (participating terminal ID) of the participating terminal participating in the reserved conference.

The session extracting unit 62 searches the session management table (see FIG. 13) of the session management DB 5005 as the reservation ID extracted by the reservation content extracting unit 61 as a search key and extracts the session ID corresponding to the reservation ID. In addition, the session extracting unit 62 searches the session management table using the participating terminal ID extracted by the reservation content extracting unit 61 as a search key and extracts the reservation ID corresponding to the participating terminal ID.

Furthermore, the session extracting unit 62 searches the session management table using the reservation ID included in the start request information as a search key and extracts the session ID and the relay device ID corresponding to the reservation ID.

The state determining unit 63 determines whether the session ID corresponding to the reservation ID is extracted and decides on the state of the conference on the basis of the determination result. In addition, the state determining unit 63 determines whether the reservation identified by the reservation ID which is extracted by the reservation content extracting unit 61 is a predetermined reservation. When it is determined that the reservation is the predetermined reservation, the state determining unit 63 determines the state of the terminal, which is a predetermined destination, to be a first state. When it is determined that the reservation is not the predetermined reservation, the state determining unit 63 determines the state of the terminal, which is a predetermined destination, to be a second state different from the first state.

The conference information creating unit 64 creates conference information including the start date and time, the name, and the state determined by the state determining unit 63 for each reservation ID extracted by the reservation content extracting unit 61. In addition, the conference information creating unit 64 creates destination information containing the terminal ID of the destination extracted by the terminal extracting unit 54, and the destination name and the operating state extracted by the terminal state acquiring unit 55. Furthermore, the conference information creating unit 64 creates detailed conference/destination information containing a communication state related to the reservation of the participating terminal determined by the state determining unit 63 for each participating terminal ID extracted by the reservation content extracting unit 61.

Process or Operation of Embodiment

Figure 17:
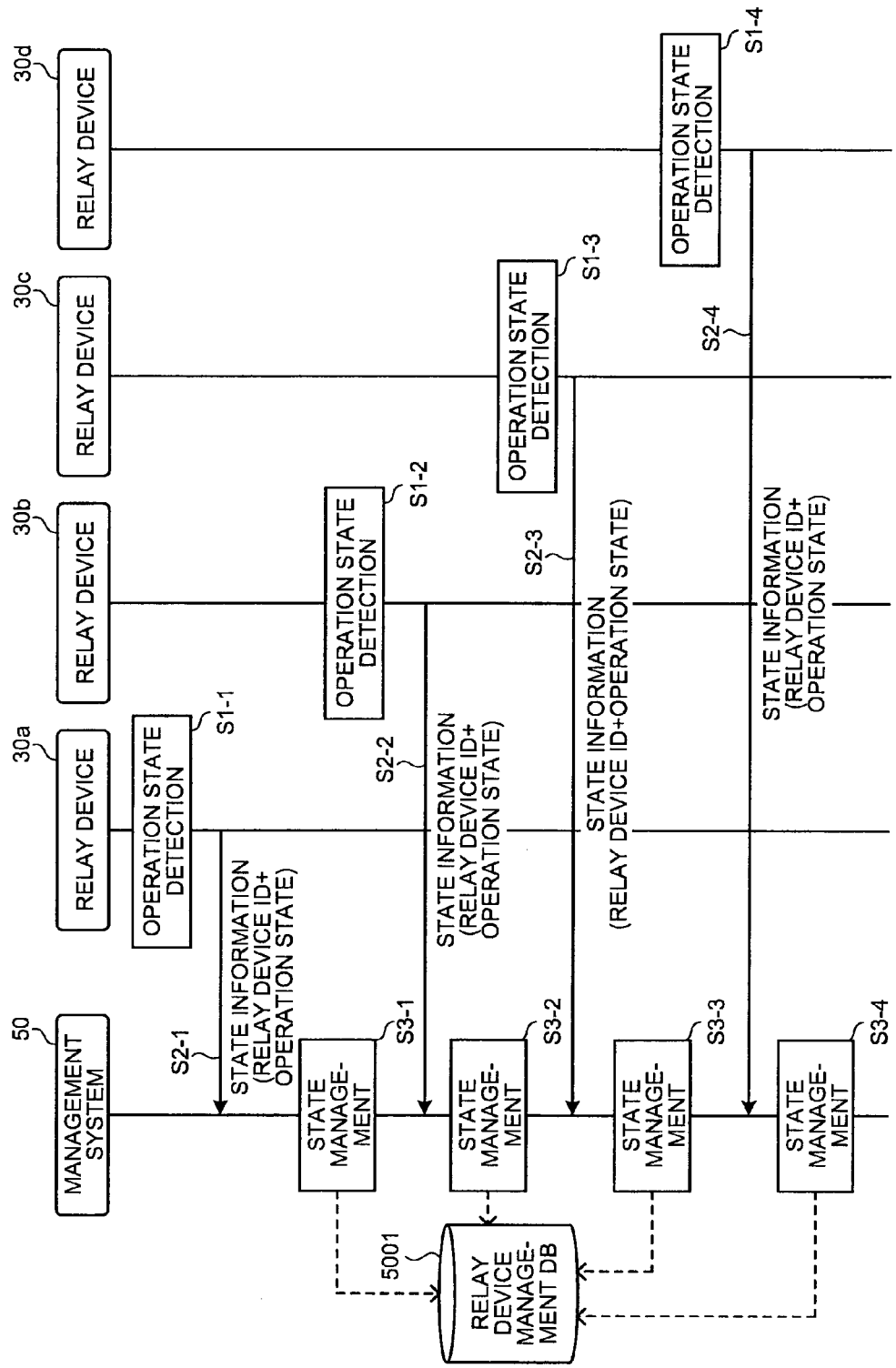
FIG. 17 is a sequence diagram illustrating a process of managing state information indicating the operating state of each relay device.
Figure 18:
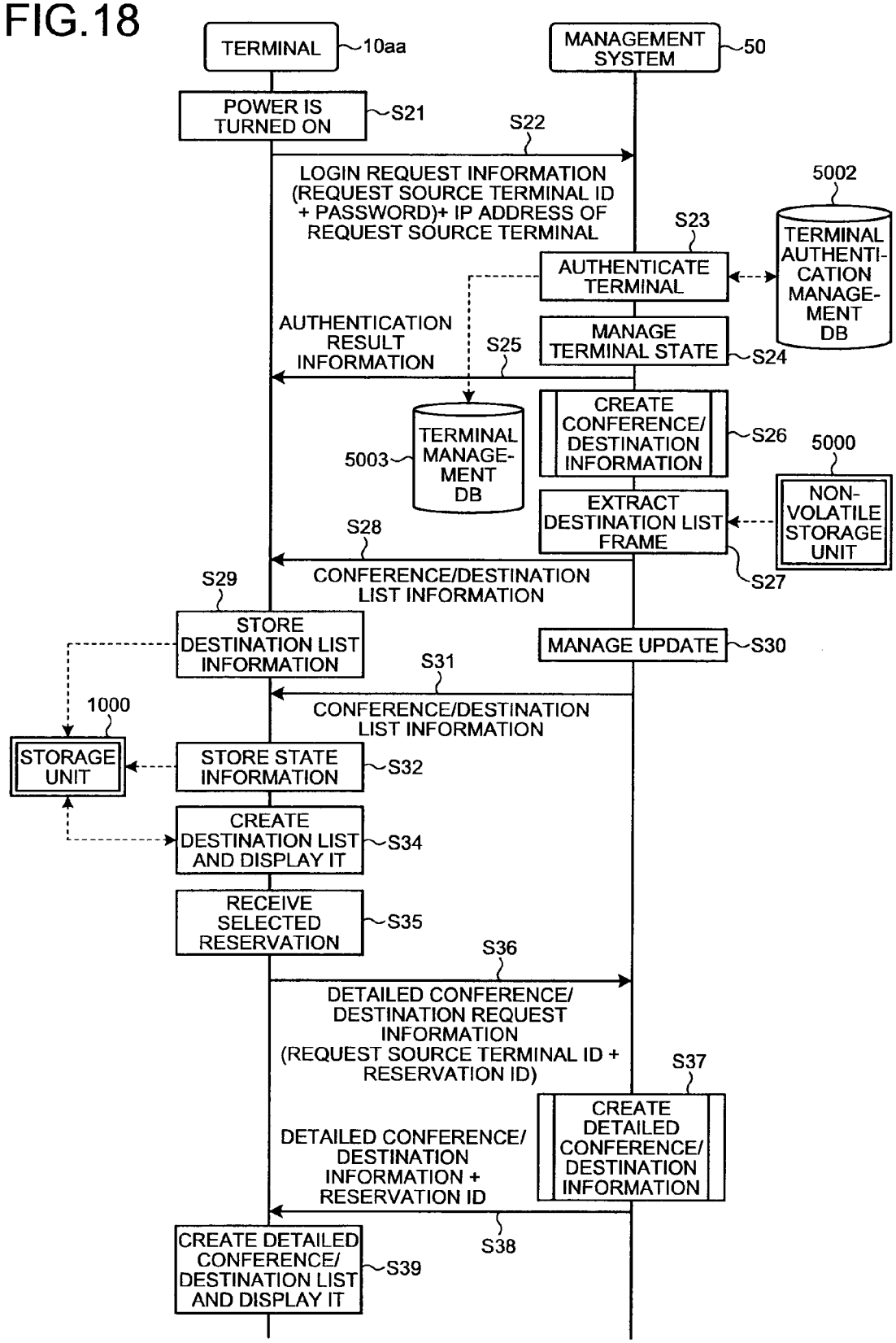
FIG. 18 is a sequence diagram illustrating a process in the preparatory stage in which communication between transmission terminals starts.
Figure 22:
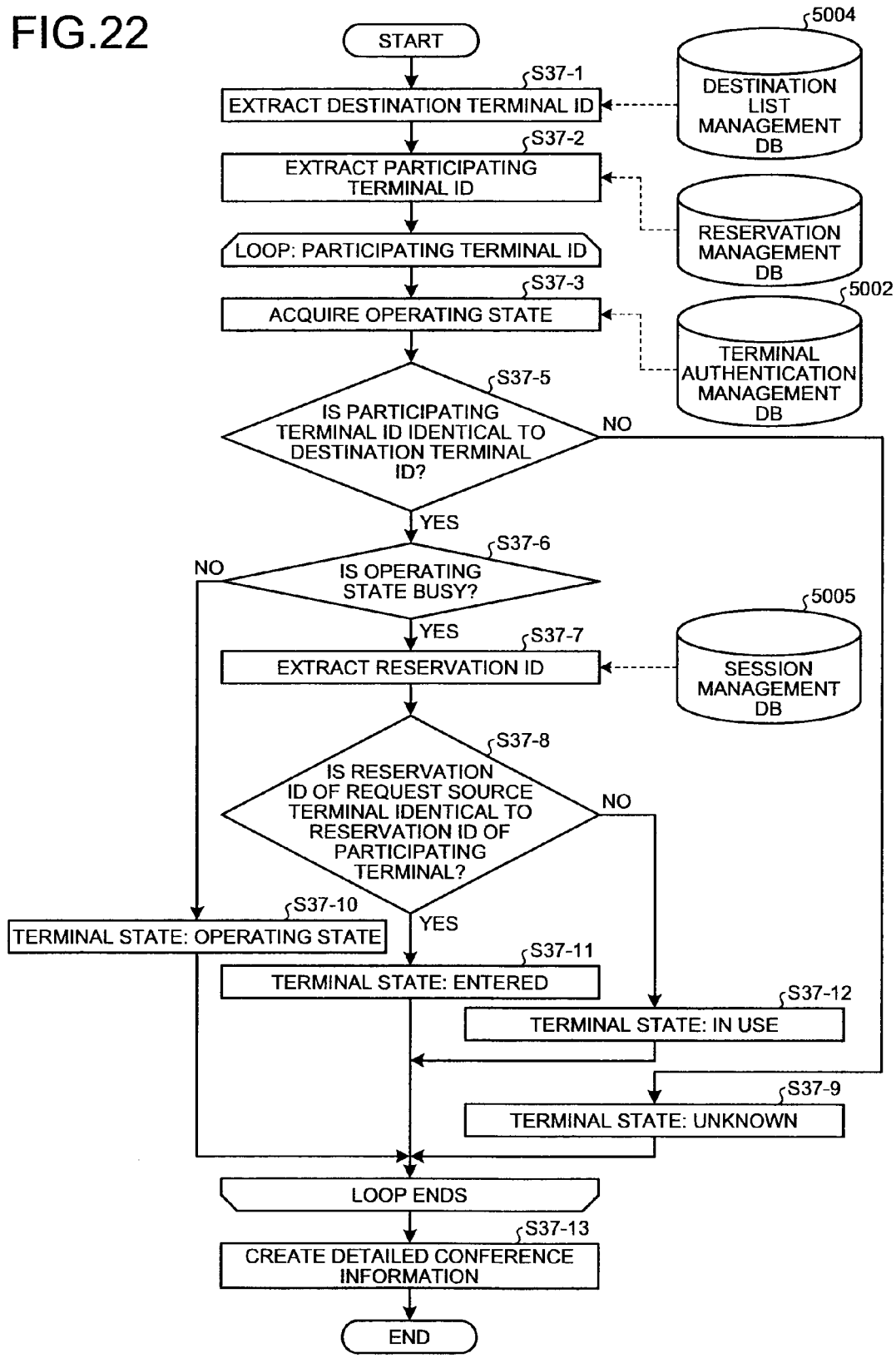
FIG. 22 is a flowchart illustrating a process of creating detailed conference/destination information.
Figures 23, 24:
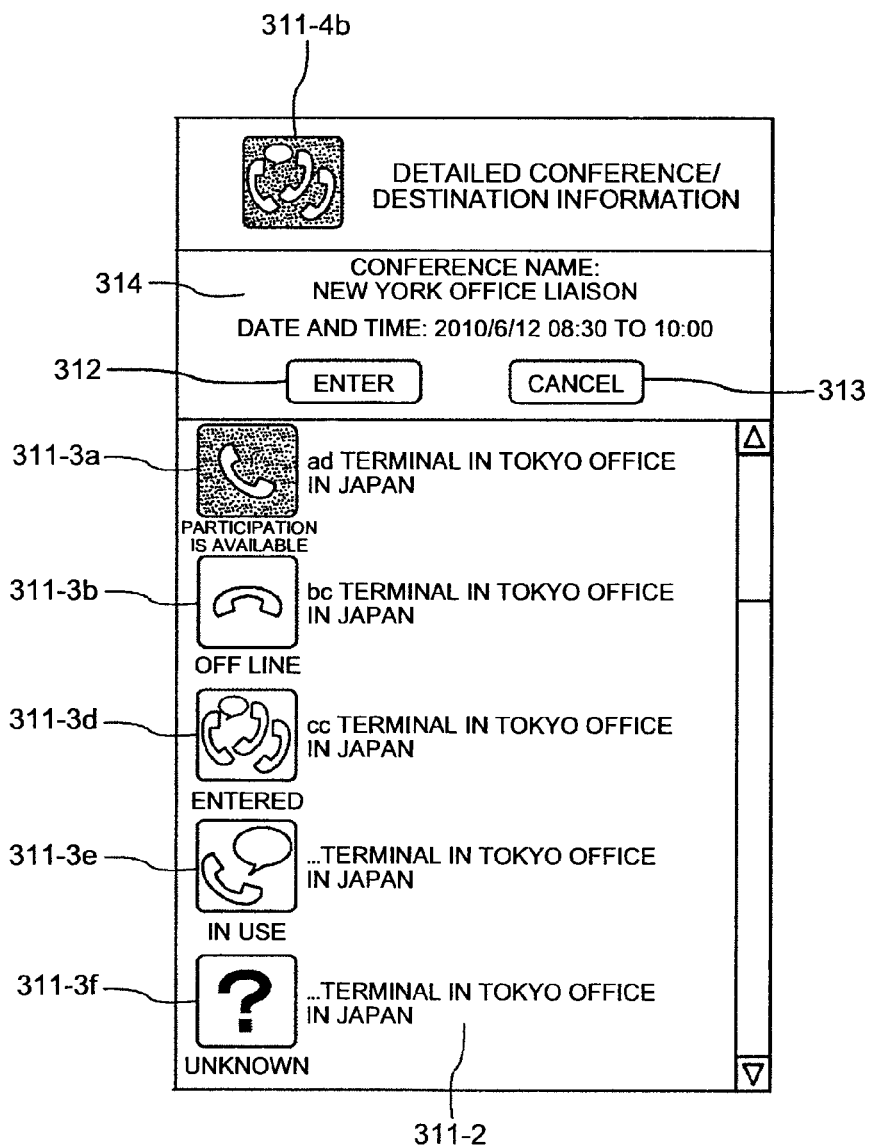
FIG. 23 is a conceptual diagram illustrating an example of conference information and detailed destination information.
FIG. 24 is a conceptual diagram illustrating a detailed conference/destination list according to this embodiment.
Figure 25:
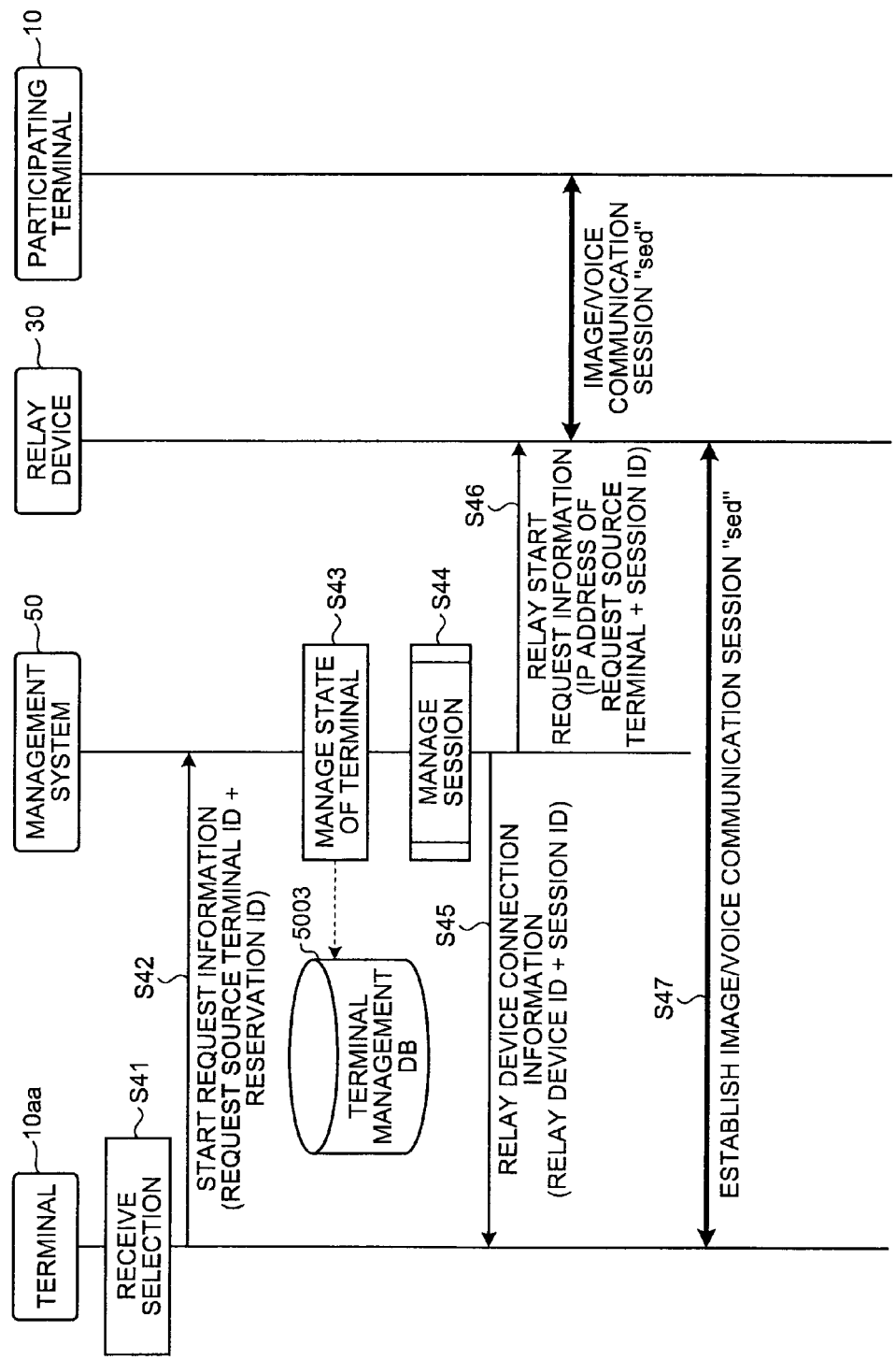
FIG. 25 is a sequence diagram illustrating the process of a request source terminal participating in a reserved session.
Figure 26:
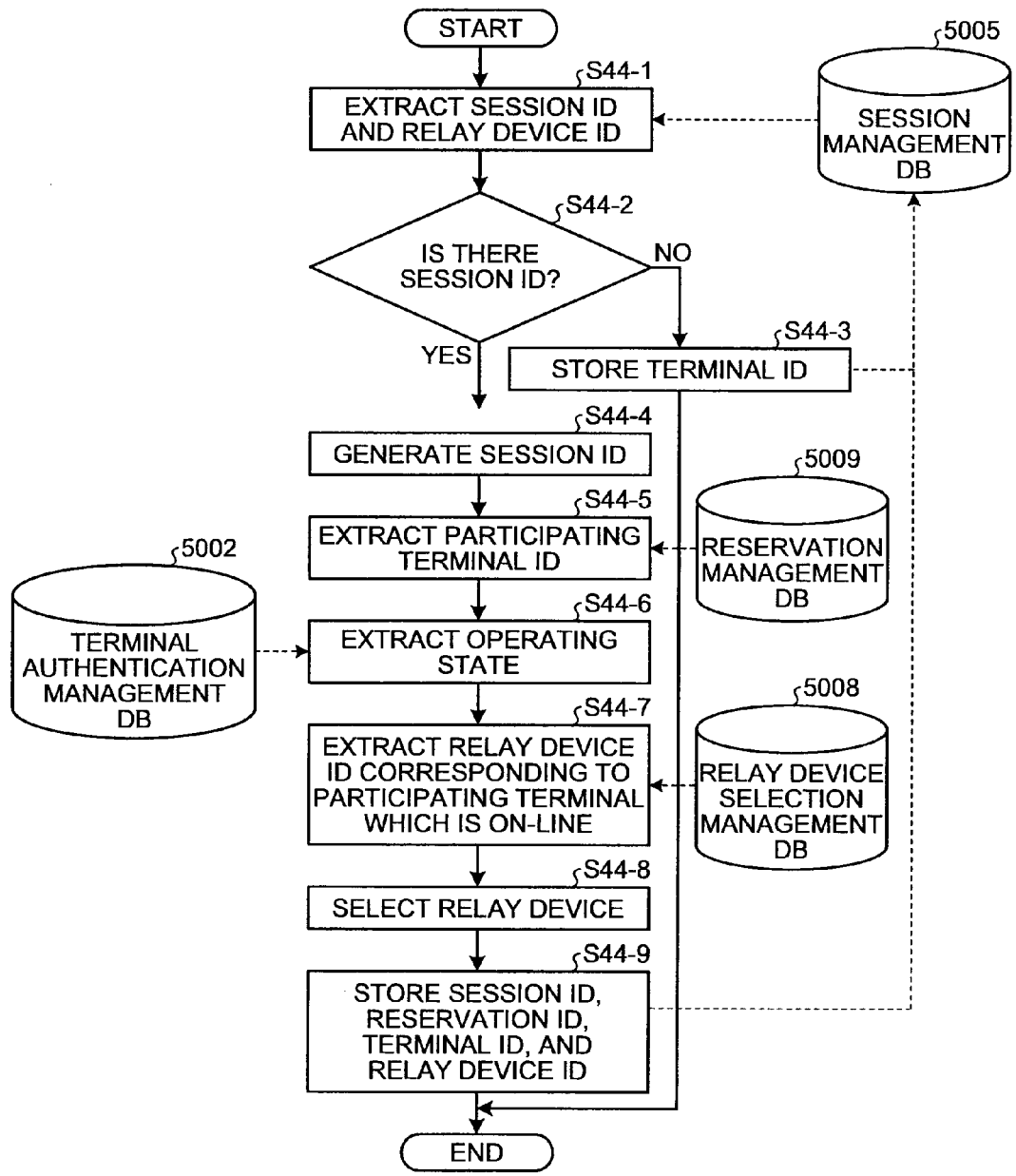
FIG. 26 is a flowchart illustrating a process of managing a session.
Figure 27:
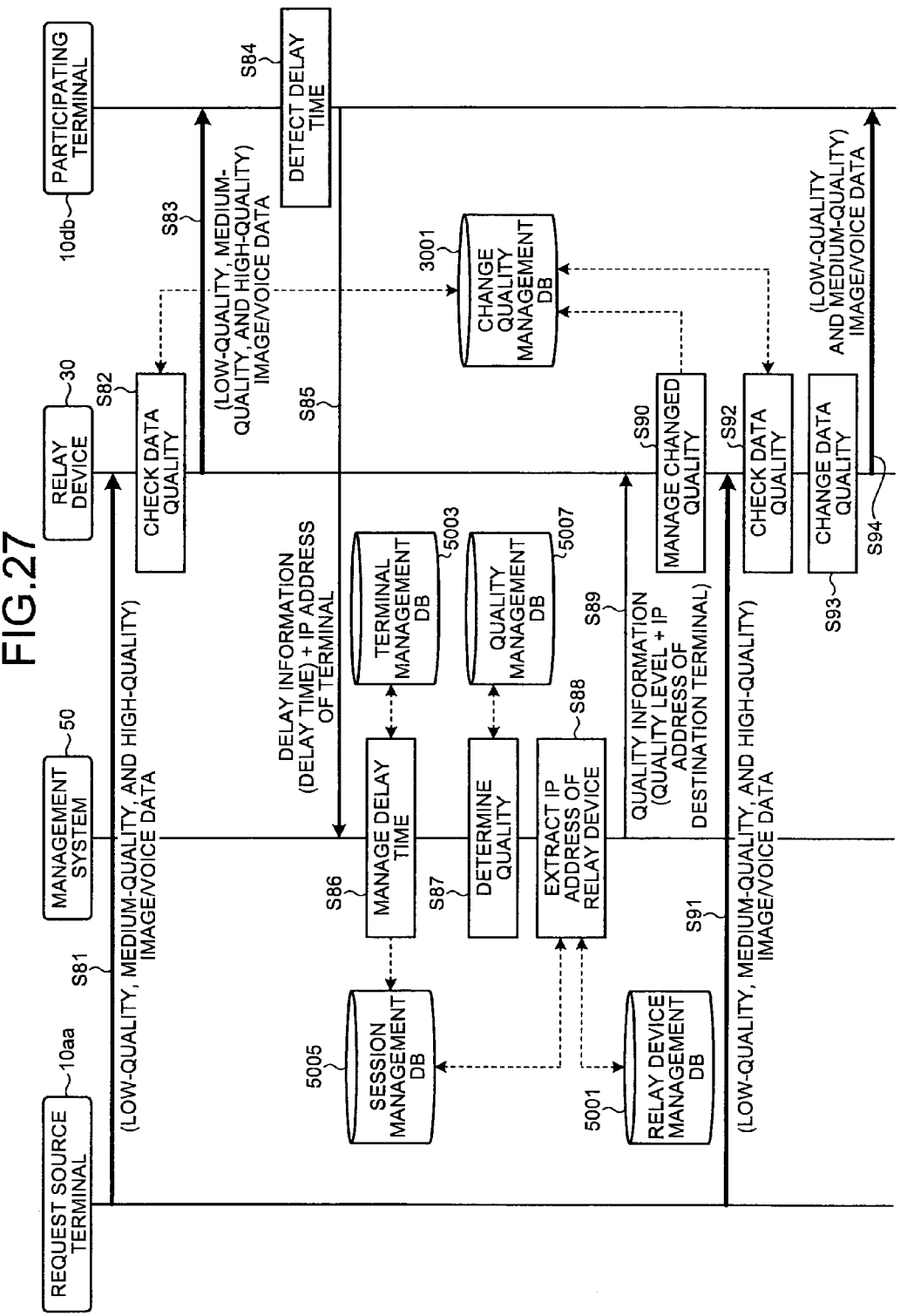
FIG. 27 is a sequence diagram illustrating a process of transmitting image data and voice data between transmission terminals.

Next, a processing method of the transmission system 1 according to this embodiment will be described with reference to FIGS. 17 to 27. FIG. 17 is a sequence diagram illustrating a process of managing the state information indicating the operating state of each relay device. FIG. 18 is a sequence diagram illustrating a process in the preparatory stage in which communication starts between the transmission terminals. FIG. 19 is a flowchart illustrating a process of creating conference information and destination information. FIGS. 20A and 20B are a conceptual diagrams illustrating an example of the conference information and an example of the destination information, respectively. FIG. 21 is a conceptual diagram illustrating a destination list according to this embodiment. FIG. 22 is a flowchart illustrating a process of creating detailed conference/destination information. FIG. 23 is a conceptual diagram illustrating an example of the detailed conference information and destination information. FIG. 24 is a conceptual diagram illustrating a detailed conference/destination list according to this embodiment. FIG. 25 is a sequence diagram illustrating the process of the request source terminal (terminal 10aa) participating in the reserved session. FIG. 26 is a flowchart illustrating a process of managing the session. FIG. 27 is a sequence diagram illustrating a process of transmitting and receiving image data and voice data between the transmission terminals.

First, a process of managing the state information indicating the state of each relay device 30 transmitted from each relay device 30 to the management system 50 will be described with reference to FIG. 17. First, in Steps S1-1 to S1-4, in each relay device 30, the state detecting unit 32 illustrated in FIG. 6 periodically detects the operating state of the relay device 30. Then, in Steps S2-1 to S2-4, the transmitting/receiving unit 31 of each relay device 30 periodically transmits the state information to the management system 50 through the communication network 2, so that the management system 50 can manage the operating state of each relay device 30 in real time. Each piece of the state information includes the relay device ID of each relay device 30 and the operating state detected by the state detecting unit 32 of the relay device 30 with each relay device ID. In this embodiment, it is assumed that the relay devices (30a, 30b, and 30d) operate normally and are "on-line" while the relay device 30c operates but is "off-line" due to an error occurring in the program for performing the relay operation of the relay device 30c.

Then, in Steps S3-1 to S3-4, the management system 50 receives the state information transmitted from each relay device 30 using the transmitting/receiving unit 51, stores the state information in the relay device management DB 5001 (see FIG. 6) of the storage unit 5000, for each relay device ID using the storing/reading unit 59, and manages the state information. In this way, any one of the operating states, such as an "on-line" state, an "off-line" state, and a "failure state", is stored for each relay device ID in the relay device management table illustrated in FIG. 9 and is managed. In this case, the date and time when the management system 50 receives the state information is also stored for each relay device ID and is managed. When the state information is not transmitted from the relay device 30, the operating state field and the reception date and time field of each record in the relay device management table illustrated in FIG. 9 are blank, or the previous operating state and the previous reception date and time are shown in the fields.

Next, a process of transmitting or receiving each piece of the management information in the preparatory stage before communication starts between a terminal 10aa and another terminal 10 will be described with reference to FIG. 18. In FIG. 18, various kinds of management information are transmitted or received by the management information session sei illustrated in FIG. 2.

First, in Step S21, when the user turns on the power switch 109 illustrated in FIG. 4, the operation input receiving unit 12 illustrated in FIG. 6 receives the power-on signal and turns on the power supply. Then, in Step S22, when power is turned on, the login request unit 13 automatically transmits login request information indicating a login request from the transmitting/receiving unit 11 to the management system 50 through the communication network 2. The login request information contains a terminal ID for identifying the terminal 10aa, in which the log in request unit 13 is included and which serves as a request source, and the password. The terminal ID and the password are read from the storage unit 1000 by the storing/reading unit 19 and then transmitted to the transmitting/receiving unit 11. When the login request information is transmitted from the terminal 10aa to the management system 50, the management system 50, which is the receiver side, can know the IP address of the terminal 10aa, which is the transmitter side.

Then, in Step S23, the terminal authentication unit 52 of the management system 50 searches the terminal authentication management table (see FIG. 10) of the terminal authentication management DB 5002 in the storage unit 5000 using, as a search key, the terminal ID and the password in the login request information received through the transmitting/receiving unit 51, and determines whether the same terminal ID and password are managed in the terminal authentication management table, thereby performing terminal authentication. In Step S24, when the terminal authentication unit 52 determines that the login request is sent from the terminal 10 with a valid authority since the same terminal ID and password are managed, the state management unit 53 stores the terminal ID of the terminal 10aa, the operating state thereof, the date and time when the login request information is received, and the IP address of the terminal 10aa in the terminal management DB 5003 (see FIG. 6) so as to be associated with each other. In this way, the operating state "on-line", the reception date and time "2010.11.10. 13:40", and the IP address "1.2.1.3" of the terminal 10aa are associated with the terminal ID "01aa" and are managed in the terminal management table illustrated in FIG. 11.

Then, in Step S25, the transmitting/receiving unit 51 of the management system 50 transmits authentication result information containing the authentication result obtained by the terminal authentication unit 52 to the request source terminal (terminal 10aa) that requests a login through the communication network 2. In this embodiment, the process when the terminal authentication unit 52 determines that the terminal has a valid authority will be described below.

In Step S26, the conference information creating unit 64 of the management system 50 creates the destination information of the request source terminal (terminal 10aa) that requests a login and the conference information of the conference including the request source terminal (terminal 10aa) as a participant. A process of creating the conference information and the destination information will be described in detail with reference to FIG. 19. FIG. 19 is a flowchart illustrating the process of creating the conference information and the destination information. In Step S26-1, the reservation content extracting unit 61 of the management system 50 searches the reservation management table (see FIG. 16) using, as a search key, the terminal ID "01aa" of the request source terminal (terminal 10aa) that requests a login and extracts the reservation IDs ("rsv03", "rsv04", . . . ). In this way, the reservation ID of the session in which the request source terminal (terminal 10aa) is reserved to participate. Alternatively, when extracting the reservation ID, the reservation content extracting unit 61 may extract only the reservation ID of the session which is reserved to be held on that day or only the reservation ID of the session which is reserved to be held within a predetermined period of time from the present time, with reference to the start date and time and the end date and time in the reservation management DB 5009.

In Step S26-2, the reservation content extracting unit 61 of the management system 50 searches the reservation management table (see FIG. 16) of the reservation management DB 5009 using the reservation ID ("rsv03", "rsv04", . . . ) as a search key and extracts the start date and time and the name for each extracted reservation ID. In this way, the start date and time, name, and session ID of the session which is reserved with each reservation ID are extracted.

In Step S26-3, the session extracting unit 62 searches the session management table (see FIG. 13) of the session management DB 5005 using the reservation ID extracted by the reservation content extracting unit 61 as a search key and extracts the session ID corresponding to the reservation ID. Then, in Step S26-4, the state determining unit 63 determines whether the session ID corresponding to the reservation ID is extracted in Step S26-3. In Step S26-5, when the session ID is extracted (YES in Step S26-4), the state determining unit 63 determines that the state of the conference (session) is "being held" on the basis of the reservation. This is because the session corresponding to the reservation has started. In Step S26-5, when the session ID is not extracted (NO in Step S26-4), the state determining unit 63 determines that the state of the conference corresponding to the reservation is "reserved". This is because the session corresponding to the reservation has not started yet. The management system 50 repeats the process from Step S26-3 to Step S26-5 or S26-6 for each reservation ID extracted by the reservation content extracting unit 61. Then, in Step S26-7, the conference information creating unit 64 creates conference information containing the start date and time, the name, and the state determined by the state determining unit 63 for each reservation ID extracted by the reservation content extracting unit 61. FIG. 20A illustrates an example of the created conference information.

In Step S26-8, the terminal extracting unit 54 of the management system 50 searches the destination list management table (see FIG. 12) of the destination list management DB 5004 using, as a search key, the terminal ID "01aa" of the request source terminal (terminal 10aa) that requests a login and reads and extracts the terminal IDs of the candidates of the destination terminals capable of communicating with the request source terminal (terminal 10aa). In this embodiment, the terminal IDs ("01ab", "01ba", ..., "01db") of the destination terminals (terminals 10ab, 10ba, ..., 10db) corresponding to the terminal ID "01aa" of the request source terminal (terminal 10aa) are extracted.

Then, in Step S26-9, the terminal state acquiring unit 55 searches the terminal management table (see FIG. 11) using the terminal IDs ("01ab", "01ba", ..., "01db") of the candidates of the destination terminals extracted by the terminal extracting unit 54 and reads the operating state ("busy", "busy", ...) and the destination name ("AB terminal in Tokyo office in Japan", "BA terminal in Osaka office in Japan", ...) for each terminal ID extracted by the terminal extracting unit 54, thereby extracting the operating state and the destination name of each terminal (10ab, 10ba, ..., 10db). Then, in Step S26-10, the conference information creating unit 64 creates destination information including the terminal ID of the destination extracted by the terminal extracting unit 54, and the destination name and the operating state extracted by the terminal state acquiring unit 55. FIG. 20B illustrates an example of the created destination information.

Then, in Step S27, the transmitting/receiving unit 51 of the management system 50 reads the data of the destination list frame (the data of the destination list frame 311-1 illustrated in FIG. 21) from the storage unit 5000 (non-volatile storage unit) through the storing/reading unit 59. In addition, in Step S28, the transmitting/receiving unit 51 transmits "conference list information (the destination list frame, the reservation ID, the state, and the start time, and the name)" including the destination list frame and the conference information created by the conference information creating unit 64 and "destination list information (the destination list frame, the terminal ID, the state, and the destination name)" including the destination information to the request source terminal (terminal 10aa). Then, in Step S29, in the request source terminal (terminal 10aa), the transmitting/receiving unit 11 receives the destination list information and the storing/reading unit 19 stores the destination list information in the storage unit 1000.

As such, in this embodiment, each terminal 10 does not manage the destination list information, but the management system 50 manages the destination list information of all the terminals in an integrated manner. Therefore, for example, even when a new terminal 10 is included in the transmission system 1, a new type of terminal 10 replacing the terminal 10 is included in the transmission system 1, or the appearance of the destination list frame is changed, the management system 50 collectively copes to the change in the system. Therefore, the time and effort for each terminal 10 to change the destination list information can be reduced.

In Step S30, the management system 50 repeatedly performs Step S26 at a predetermined timing to manage the update of the destination information and the conference information. In Step S31, when either the destination information or the conference information is updated, the transmitting/receiving unit 51 transmits the conference list information (the destination list frame, the reservation ID, the state, the start time, and the name) and the destination list information (the destination list frame, the terminal ID, the state, and the destination name) to the request source terminal (terminal 10aa).

Then, in Step S32, the storing/reading unit 19 of the request source terminal (terminal 10aa) sequentially stores the state information of the terminal and the state information of the conference received from the management system 50 in the storage unit 1000. Therefore, the request source terminal (terminal 10aa) can acquire the operating state of the terminal 10ab, which is the candidate of the destination terminal capable of communicating with the request source terminal (terminal 10aa) at the present time, or the state of the reserved conference on the basis of the received state information.

Then, in Step S34, the destination list creating unit 20 of the request source terminal (terminal 10aa) creates a destination list to which the state of the terminal 10, which is the candidate of the destination, is reflected as well as creates a conference list to which the state of the reserved conference is reflected, on the basis of the state information of the terminal and the state information of the conference stored in the storage unit 1000. The display control unit 16 controls the display timing of the destination list and the conference list on the display 120 illustrated in FIG. 4.

In this way, as illustrated in FIG. 21, the destination list in which the address names 311-2 and the icons 311-3a to 311-3c to each of which the state information is reflected are displayed in the destination list frame 311-1 is displayed on the display 120aa.

Then, in Step S35, when the user of the request source terminal (terminal 10aa) presses the operation button 108 illustrated in FIG. 4 to select a reserved conference from the displayed conference list, the operation input receiving unit 12 illustrated in FIG. 6 receives a request for detailed information (detailed conference/destination information) about the reserved conference and the destination terminals participating in the conference. In Step S36, the transmitting/receiving unit 11 of the request source terminal (terminal 10aa) transmits detailed conference/destination request information which includes the terminal ID of the request source terminal (terminal 10aa) and the reservation ID of the selected conference and requests to acquire the communication state of a terminal, which is a destination in the reservation to the management system 50. Then, the transmitting/receiving unit 51 of the management system 50 receives the detailed conference/destination request information, thereby receiving a request to acquire the communication state of a terminal, which is a predetermined destination, in a predetermined communication reservation.

Then, in Step S37, the conference information creating unit 64 of the management system 50 creates detailed conference/destination information related to the conference selected by the request source terminal (terminal 10aa) and the destination terminal participating in the conference. A process of creating the detailed conference/destination information will be described in detail with reference to FIG. 22. FIG. 22 is a flowchart illustrating the process of creating the detailed conference/destination information. In Step S37-1, the terminal extracting unit 54 of the management system 50 searches the destination list management table (see FIG. 12) of the destination list management DB 5004 using, as a search key, the terminal ID "01aa" of the request source terminal (terminal 10aa), and reads and extracts the terminal ID of the candidate of the destination terminal capable of communicating with the request source terminal (terminal 10aa).

Then, in Step S37-2, the reservation content extracting unit 61 of the management system 50 searches the reservation management table (see FIG. 16) of the reservation management DB 5009 using the reservation ID in the detailed conference/destination request information transmitted from the request source terminal (terminal 10aa) as a search key, and extracts the terminal ID (participating terminal ID) of a participating terminal participating in the reserved conference. Then, in Step S37-3, the terminal state acquiring unit 55 searches the terminal management table (see FIG. 11) of the terminal management DB 5003 for each participating terminal ID extracted by the reservation content extracting unit 61, using the participating terminal ID as a search key and reads the operating state, thereby extracting the operating state of the participating terminal.

In Step S37-5, the state determining unit 63 determines whether the participating terminal ID extracted by the reservation content extracting unit 61 is the same as any one of the terminal IDs of the candidates of the destination terminals extracted by the terminal extracting unit 54. In Step S37-9, when it is determined in Step S37-5 that there the participating terminal ID is not the same as any one of the terminal IDs of the candidates of the destination terminals (NO in Step S37-5), the state determining unit 63 determines the state of the participating terminal identified by the participating terminal ID to be "unknown". This is because the request source terminal (terminal 10aa) cannot normally know the state of the participating terminal, for security reasons, when the participating terminal is not listed in the candidates of the destination terminals.

In Step S37-6, when the terminal ID is identical to the terminal ID of any one of the candidates of the destination terminals in Step S37-5 (YES in Step S37-5), the state determining unit 63 determines whether the operating state extracted by the terminal state acquiring unit 55 to be "busy". In Step S37-10, when the operating state extracted by the terminal state acquiring unit 55 is not "busy" (NO in Step S37-6), the state determining unit 63 determines the state of the participating terminal identified by the participating terminal ID to be the operating state (for example, "off-line") extracted by the terminal state acquiring unit 55 in Step S37-3. In Step S37-7, when the operating state extracted by the terminal state acquiring unit 55 is "busy" (YES in Step S37-6), the session extracting unit 62 searches the session management table (see FIG. 13) of the session management DB 5005 using the participating terminal ID extracted by the reservation content extracting unit 61 as a search key and extracts the reservation ID corresponding to the participating terminal ID.

Then, in Step S37-8, the state determining unit 63 determines whether the reservation which is identified by the reservation ID extracted by the reservation content extracting unit 61 is the same as that identified by the reservation ID in the detailed conference/destination request information transmitted from the request source terminal (terminal 10aa). In Step S37-11, when the reservation ID corresponding to the participating terminal ID is the same as that transmitted from the request source terminal (terminal 10aa) (YES in Step S37-8), the state determining unit 63 determines the state related to the reservation of the participating terminal identified by the participating terminal ID to be "entered" (first state). This is because the participating terminal has already participated in the conference (session) through the reservation which is identified by the reservation ID selected by the request source terminal (terminal 10aa). In Step S37-12, when the reservation ID corresponding to the participating terminal ID is different from the reservation ID transmitted from the request source terminal (terminal 10aa) (NO in Step S37-8), the state determining unit 63 determines the state related to the reservation of the participating terminal identified by the participating terminal ID to be "in use" (second state). This is because the participating terminal performs another session different from the session through the reservation which is identified by the reservation ID selected by the request source terminal (terminal 10aa). The management system 50 repeatedly performs the process from Step S37-3 to Step S37-9 or S37-11 for each participating terminal ID extracted by the reservation content extracting unit 61. Then, in Step S37-13, the conference information creating unit 64 creates detailed conference/destination information containing the state information indicating the communication state of the participating terminal related to the reservation which is determined by the state determining unit 63 for each participating terminal ID extracted by the reservation content extracting unit 61. The state information includes, for example, information (first state information) indicating the state "entered" and information (second state information) indicating the state "in use". FIG. 23 illustrates an example of the created detailed conference/destination information.

Then, in Step S38, the transmitting/receiving unit 51 of the management system 50 transmits, to the request source terminal (terminal 10aa), the detailed conference/destination information created by the conference information creating unit 64 and the reservation ID in the detailed conference/destination request information transmitted from the request source terminal (terminal 10aa). Then, in Step S39, the destination list creating unit 20 of the request source terminal (terminal 10aa) creates a detailed conference/destination list to which the communication state of the participating terminal related to the reservation is reflected, on the basis of the detailed conference/destination information transmitted from the management system 50, and the conference list information and the destination list information stored in the storage unit 1000. The display control unit 16 controls the display timing of the detailed conference/destination list on the display 120 illustrated in FIG. 4.

In this way, as illustrated in FIG. 24, in the display 120, the destination list in which, for example, the conference start time and conference name 314, the destination names 311-2, and the icons 311-3a to 311-3f to each of which the state of the conference or the participating terminal is reflected are displayed is displayed on the display 120aa. When the state of the participating terminal is "busy", for example, an icon 311-3d indicating the state "entered", an icon 311-3e indicating the state "in use", and an icon 311-3f indicating the state "unknown" are displayed on the basis of the state determined by the state determining unit 63. In this way, the user of the request source terminal (terminal 10aa) can know the communication state of the participating terminal related to the reservation and participate in the session according to the communication state. The display control unit 16 can display an entrance button 312 for participating in the reserved session and a cancellation button 313 for returning to the screen (see FIG. 21) on which the destination list and the conference list are displayed, without participating in the reserved session, together with the detailed conference/destination list. In this way, the request source terminal (terminal 10*aa*) can receive an input to participate in the reserved conference from the screen on which the detailed conference/destination list is displayed.

In another terminal 10, similarly to Step S21, when the user turns on the power switch 109 illustrated in FIG. 5, the operation input receiving unit 12 illustrated in FIG. 6 receives the power-on signal and the same steps as Steps S22 to S39 are performed. Therefore, a description thereof will not be repeated.

Next, a process when the request source terminal (terminal 10*aa*) participates in the reserved session will be described with reference to FIG. 25. FIG. 25 is a sequence diagram the process of the request source terminal (terminal 10*aa*) participating in the reserved session. In FIG. 25, various kinds of management information are transmitted or received by the management information session sei. In this embodiment, the request source terminal (terminal 10*aa*) receives the selection of the entrance button 312 which is displayed together with the detailed conference/destination list, thereby receiving a request to participate in the reserved session. Next, a case in which a predetermined entrance button 312 is selected will be described.

First, in Step S41, when the user of the request source terminal (terminal 10*aa*) presses the operation button 108 illustrated in FIG. 4 to select the entrance button 312, the operation input receiving unit 12 illustrated in FIG. 6 receives a request to participate in the reserved session. In Step S42, the transmitting/receiving unit 11 of the terminal 10*aa* transmits, to the management system 50, start request information (an example of communication state information) that contains the terminal ID of the request source terminal (terminal 10*aa*) and the reservation ID for identifying the selected reservation and indicates that the session has started. Then, the transmitting/receiving unit 51 of the management system 50 receives the start request information and knows the IP address of the request source terminal (terminal 10*aa*), which is a transmission source.

Then, in Step S43, the state management unit 53 changes the content in the operating state field of the record containing the terminal ID in the terminal management table (see FIG. 11) of the terminal management DB 5003 to "busy" on the basis of the terminal ID of the request source terminal (terminal 10*aa*) contained in the start request information. In this state, the request source terminal (terminal 10*aa*) does not start communication, but is in a communicating state. Therefore, when another terminal 10 communicates with the terminal 10*aa*, a voice or an image indicating the fact that the terminal is communicating is output.

Then, in Step S44, the management system 50 manages the session (image/voice data session "sed") for communication through the reservation which is selected by the request source terminal (terminal 10*aa*). A process of managing the session will be described in detail with reference to FIG. 26. FIG. 26 is a flowchart illustrating the process of managing the session. First, in Step S44-1, the session extracting unit 62 of the management system 50 searches the session management table (see FIG. 13) of the session management DB 5005 using, as a search key, the reservation ID contained in the start request information and extracts the relay device ID and the session ID corresponding to the reservation ID. Then, in Step S44-2, the session management unit 57 determines whether the session ID corresponding to the reservation ID is extracted in Step S44-1.

When the session ID is extracted in Step S44-2 (YES in Step S44-2), in Step S44-3, the session management unit 57 stores the terminal ID of the request source terminal (terminal 10*aa*) contained in the start request information in the participating terminal ID field of the record containing the extracted session ID in the session management table (see FIG. 13) of the session management DB 5005 and manages the terminal ID. When the session ID is not extracted in Step S44-2 (NO in Step S44-2), in Step S44-4, the session ID generating unit 56*a* generates a session ID for identifying the session (image/voice data session "sed") for which content data is transmitted between the terminals through the reservation which is selected by the request source terminal (terminal 10*aa*).

Then, the management system 50 performs a process for selecting the relay device 30 relaying image/voice data for the session (image/voice data session "sed") for communication through the reservation selected by the request source terminal (terminal 10*aa*). In this case, first, in Step S44-5, the reservation content extracting unit 61 of the management system 50 searches the reservation management table (see FIG. 16) of the reservation management DB 5009 using, as a search key, the reservation ID in the start request information transmitted from the request source terminal (terminal 10*aa*) and extracts the terminal ID (participating terminal ID) of the terminal 10 participating in the reserved conference. Then, in Step S44-6, the terminal state acquiring unit 55 searches the terminal management table (see FIG. 11) of the terminal management DB 5003 using, as a search key, the participating terminal ID extracted by the reservation content extracting unit 61 and reads the operating state, thereby extracting the operating state of the participating terminal.

Then, in Step S44-7, the relay device extracting unit 56*b* searches the relay device selection management table (see FIG. 15) of the relay device selection management DB 5008 on the basis of the participating terminal ID of the participating terminal whose operating state is "on-line" among the participating terminal IDs extracted by the reservation content extracting unit 61, and extracts the relay device ID corresponding to the participating terminal. In Step S44-8, the selecting unit 56*c* selects the relay device 30 that relays image/voice data for the session on the basis of the extracted relay device ID. When there are a plurality of participating terminals which are "on-line", a plurality of relay devices ID are extracted, and the extracted relay devices ID are not identical to each other, the selecting unit 56*c* selects a relay device 30*e* as the relay device 30 for relaying the image/voice data.

In Step S44-9, when the selection of the relay device 30 is completed, the session management unit 57 stores the session ID generated in Step S44-4, the terminal ID of the request source terminal (terminal 10*aa*) and the reservation ID included in the start request information, and the relay device ID of the relay device selected in Step S44-8 in the session management DB 5005 so as to be associated with each other.

Then, in Step S45, the transmitting/receiving unit 51 illustrated in FIG. 6 transmits, to the request source terminal (terminal 10*aa*), relay device connection information which contains the relay device ID extracted in Step S44-1 or the relay device ID extracted in Step S44-8 and the session ID extracted in Step S44-1 or the session ID extracted in Step S44-4 and is for connection to the selected relay device 30. The relay device connection information may contain the IP address of the relay device 30. In this case, the transmitting/receiving unit 51 may extract the IP address of the relay device corresponding to the relay device ID extracted in Step S44-1 or the relay device ID selected in Step S44-8 from the relay device management table (see FIG. 9) of the relay device management DB 5001 and transmit the IP address to the request source terminal (terminal 10*aa*). In this way, the request source terminal (terminal 10*aa*) can know the relay device connection information used for connection to the relay device 30 for relaying the image/voice data in the execution of the session corresponding to the session ID.

Then, in Step S46, the transmitting/receiving unit 51 of the management system 50 transmits relay start request information containing a request to start a relay operation to the selected relay device 30 through the communication network 2. The relay start request information contains the IP address "1.2.1.3" of the request source terminal (terminal 10*aa*) that relays data, and the session ID extracted in Step S44-1 or the session ID generated in Step S44-4. In this way, the relay device 30 can know that three pieces of image data, that is, low-resolution image data, medium-resolution image data, and high-resolution image data, and voice data are relayed between the terminals participating in the session through the reservation selected by the request source terminal (terminal 10*aa*).

In Step S47, the request source terminal (terminal 10*aa*) establishes connection to the selected relay device 30 using the relay device connection information transmitted from the management system 50 and transmits three pieces of image data, that is, low-resolution image data, medium-resolution image data, and high-resolution image data, and voice data. In this way, the request source terminal (terminal 10*aa*) can perform image/voice data communication with the participating terminal connected to the relay device 30 on the basis of the same reservation by the same process as Steps S41 to S47 and start a teleconference.

Next, a process of transmitting image data and voice data between the request source terminal (terminal 10*aa*) and the participating terminal (in this embodiment, the terminal 10*db*) in order to perform teleconference communication will be described with reference to FIGS. 6 and 27. For example, the transmission or reception of image data and voice data or the detection of a delay time, which will be described below, are performed in the same way in a process of transmitting image data and voice data from the terminal 10*aa* to the terminal 10*db* in one direction and a process of transmitting image data and voice data from the terminal 10*db* to the terminal 10*aa* in the opposite direction. Therefore, only the communication in the one direction will be described, but the communication in the opposite direction will not be described.

First, in Step S81, the request source terminal (terminal 10*aa*) transmits the image data of the object captured by the imaging unit 14 and the voice data of the voice input by the voice input unit 15*a* from the transmitting/receiving unit 11 to the relay device 30 through the communication network 2 for the image/voice data session "sed". In this embodiment, the request source terminal transmits voice data and high-quality image data including three pieces of image data, that is, low-resolution image data, medium-resolution image data, and high-resolution image data illustrated in FIG. 2. Then, in Step S82, in the relay device 30, the transmitting/receiving unit 31 receives the three-resolution image data and the voice data. Then, the data quality checking unit 33 searches the change quality management table (see FIG. 8) of the change quality management DB 3001 using the IP address "1.3.2.4" of the participating terminal (terminal 10*db*) as a search key and extracts the image quality of corresponding image data to be relayed, thereby checking the image quality of the image data to be relayed. In this embodiment, in Step S83, since the checked image quality of the image data is "high-image quality" and is the same as that of the image data received by the transmitting/receiving unit 31, the relay device 30 transmits the image data and the voice data to the participating terminal (terminal 10*db*) for the image/voice data session sed, without changing the image quality of the image data and the voice quality of the voice data. Then, in the participating terminal (terminal 10*db*), the transmitting/receiving unit 11 can receive the image data and the voice data, the display control unit 16 can display the image based on the image data on the display 120, and the voice output unit 15*b* can output the voice based on the voice data.

Then, in Step S84, the delay detecting unit 18 of the participating terminal (terminal 10*db*) detects the reception delay time of the image data received by the transmitting/receiving unit 11 at a predetermined time interval (for example, at an interval of 1 second). In this embodiment, a case in which the delay time is 200 (ms) will be described below.

In Step S85, the transmitting/receiving unit 11 of the participating terminal (terminal 10*db*) transmits delay information indicating that the delay time is "200 (ms)" to the management system 50 through the communication network 2 for the management information session sei. In this way, the management system 50 can know the delay time and the IP address "1.3.2.4" of the terminal 10*db*, which is the transmission source of the delay information.

Then, in Step S86, the delay time management unit 60 of the management system 50 searches the terminal management table (see FIG. 11) of the terminal management DB 5003 using, as a search key, the IP address "1.3.2.4" of the destination terminal (terminal 10*db*) and extracts the corresponding terminal ID "01*db*". In addition, the delay time management unit 60 stores a delay time of "200 (ms)" indicated by the delay information in a delay time field of the record of the terminal ID "01*db*" in the session management DB 5005 (see FIG. 6) and manages the delay time.

Then, in Step S87, the quality determining unit 58 searches the quality management table (see FIG. 14) of the quality management DB 5007 using the delay time of "200 (ms)" as a search key, extracts the image quality "medium image quality" of the corresponding image data, and determines the image quality to be "medium image quality".

Then, in Step S88, the transmitting/receiving unit 51 searches the relay device management table (see FIG. 9) of the relay device management DB 5001 using, as a search key, the relay device ID associated with the terminal ID "01*db*" in the session management table (see FIG. 13) of the session management DB 5005, and extracts the IP address of the corresponding relay device 30. Then, in Step S89, the transmitting/receiving unit 51 transmits quality information indicating the image quality "medium image quality" of the image data determined in Step S87 to the relay device 30 through the communication network 2 for the management information session sei. The quality information includes the IP address "1.3.2.4" of the destination terminal (terminal 10*db*) used as a search key in Step S86. Then, in Step S90, in the relay device 30, the change quality management unit 34 stores the IP address "1.3.2.4" of the terminal 10 (in this embodiment, the destination terminal (terminal 10*db*)), which is a transmission destination, and the image quality "medium image quality" of the image data to be relayed in the change quality management table (see FIG. 8) of the change quality management DB 3001 so as to be associated with each other and manages the stored data.

Then, in Step S91, the participating terminal (terminal 10*aa*) transmits voice data and high-quality image data containing three pieces of image data, that is, low-quality image data, medium-quality image data, and high-quality image data to the relay device 30 for the image/voice data session sed, similarly to Step S81. Then, in Step S92, in the relay device 30, similarly to Step S82, the data quality checking unit 33 searches the change quality management DB 3001 (see FIG. 8) of the change quality management DB 3001 using the IP address "1.3.2.4" of the destination terminal (terminal 10*db*) as a search key, and extracts the image quality "medium image quality" of the corresponding image data to be relayed, thereby checking the image quality of the image data to be relayed. In this embodiment, since the checked image quality of the image data is "medium image quality" and is less than the image quality "high image quality" of the image data received by the transmitting/receiving unit 31, the data quality changing unit 35 reduces the image quality of the image data from "high image quality" to "medium image quality", thereby in Step S93, changing the image quality of the image data. Then, in Step S94, the transmitting/receiving unit 31 transmits the image data whose image quality has been changed to "intermediate image quality" and the voice data whose voice quality has not been changed to the participating terminal (terminal 10*db*) through the communication network 2 for the image/voice data session "sed". As such, when a reception delay occurs in the participating terminal (terminal 10*db*) which receives the image data, the relay device 30 can change image quality such that the person who participates in the teleconference does not feel a sense of incongruity.

Main Effect of Embodiment

As described above, according to this embodiment, in the case where the terminal 10 performs communication through a reservation, the terminal ID for identifying the terminal 10 and the reservation ID for identifying the reservation are stored in the session management table (see FIG. 13) of the session management DB 5005 in the management system 50 so as to be associated with each other and are managed. The session extracting unit 62 of the management system 50 extracts the reservation ID from the session management table on the basis of the terminal ID for identifying the destination terminal having a predetermined communication reservation. The state determining unit 63 of the management system 50 determines the state of the destination terminal which is reserved to participate in the communication through the predetermined reservation, based on whether the reservation identified by the extracted reservation ID is identical to the predetermined communication reservation. In this way, it is possible to determine whether the destination terminal has started the communication though the predetermined reservation. Therefore, even in the case where there is a request to start a reserved teleconference after the destination terminal starts the communication through the predetermined reservation, it is not necessary to check the communication state of the destination terminal using another communication unit.

According to this embodiment, when communication between the terminals is reserved, the reservation ID for identifying the reservation and the terminal ID for identifying the terminal which is revered to perform communication are stored in the reservation management table (see FIG. 16) of the reservation management DB 5009 in the management system 50 so as to be associated with each other and are managed. The reservation content extracting unit 61 extracts the terminal ID of the destination terminal from the reservation management table on the basis of the reservation ID received by the transmitting/receiving unit 51. In this way, the request source terminal does not need to designate the terminal ID of the destination terminal at a time when acquiring the state of the destination terminal.

According to this embodiment, the state determining unit 63 determines that the destination terminal is "entered" when the reservation ID extracted by the session extracting unit 62 is identical to the reservation ID received by the transmitting/receiving unit 51, and determines that the destination terminal is "in use" when the reservation IDs are different from each other. In this way, the management system can easily determine the state of the destination terminal which is reserved to participate in the communication through the predetermined reservation.

Supplement of Embodiment

The management system 50 and the program providing system 90 according to the above-described embodiments may be constructed by a single computer or a plurality of computers to which divided units (functions or units) are arbitrarily allocated. When the program providing system 90 is constructed by a single computer, the program transmitted by the program providing system 90 may be divided into a plurality of modules and then transmitted, or it may be transmitted without being divided. When the program providing system 90 is constructed by a plurality of computers, the program may be divided into a plurality of modules and then transmitted from each of the computers.

The recording medium storing the terminal program, the relay device program, and the transmission management program according to this embodiment, the HD 204 storing these programs, and the program providing system 90 including the HD 204 are each used when the terminal program, the relay device program, and the transmission management program are provided as program products to, for example, the domestic and foreign users.

In the above-described embodiment, as an example of the image quality of the image data relayed by the relay device 30, the resolution of the image of the image data is managed by the change quality management table illustrated in FIG. 8 and the quality management table illustrated in FIG. 14, but the invention is not limited thereto. For example, as another example of the image quality, the depth of the image quality of the image data, the sampling frequency of the voice of the voice data, and the bit length of the voice of the voice data may be managed.

In FIGS. 9, 11, and 13, the reception date and time is managed, but the invention is not limited thereto. In the reception date and time, at least the reception time may be managed.

In the above-described embodiment, the IP address of the relay device is managed in FIG. 9 and the IP address of the terminal is managed in FIG. 11. However, the invention is not limited thereto. For example, each Fully Qualified Domain Name (FQDN) may be managed using relay device specification information for specifying the relay device 30 on the communication network 2 or terminal specification information for specifying the terminal 10 on the communication network 2. In this case, a known Domain Name System (DNS) server acquires the IP address corresponding to FQDN. In addition to the "relay device specification information for specifying the relay device 30 on the communication network 2", "relay device connection destination information indicating a connection destination to the relay device 30 on the communication network 2" or "relay device destination information indicating a destination to the relay device 30 on the communication network 2" may be used. Similarly, in addition to the "terminal specification information for specifying the terminal 10 on the communication network 2", "terminal connection destination information communication indicating a connection destination to the terminal 10 on the network 2" or "terminal destination information indicating a destination to the terminal 10 on the communication network 2" may be used.

In this embodiment, the term "teleconference" may be replaced with a "video conference".

In the above-described embodiment, the teleconference system is given as an example of the transmission system 1, but the invention is not limited thereto. A telephone system, such as an Internet Protocol (IP) telephone or an Internet telephone, may be used as the transmission system 1. In addition, the transmission system 1 may be a car navigation system. In this case, for example, one terminal 10 corresponds to a car navigation device provided in the vehicle, and the other terminal 10 corresponds to a management terminal or a management server in a management center that manages car navigation, or a car navigation device provided in another vehicle. The transmission system 1 may be a voice conference system or a PC screen sharing system.

Figure 28:
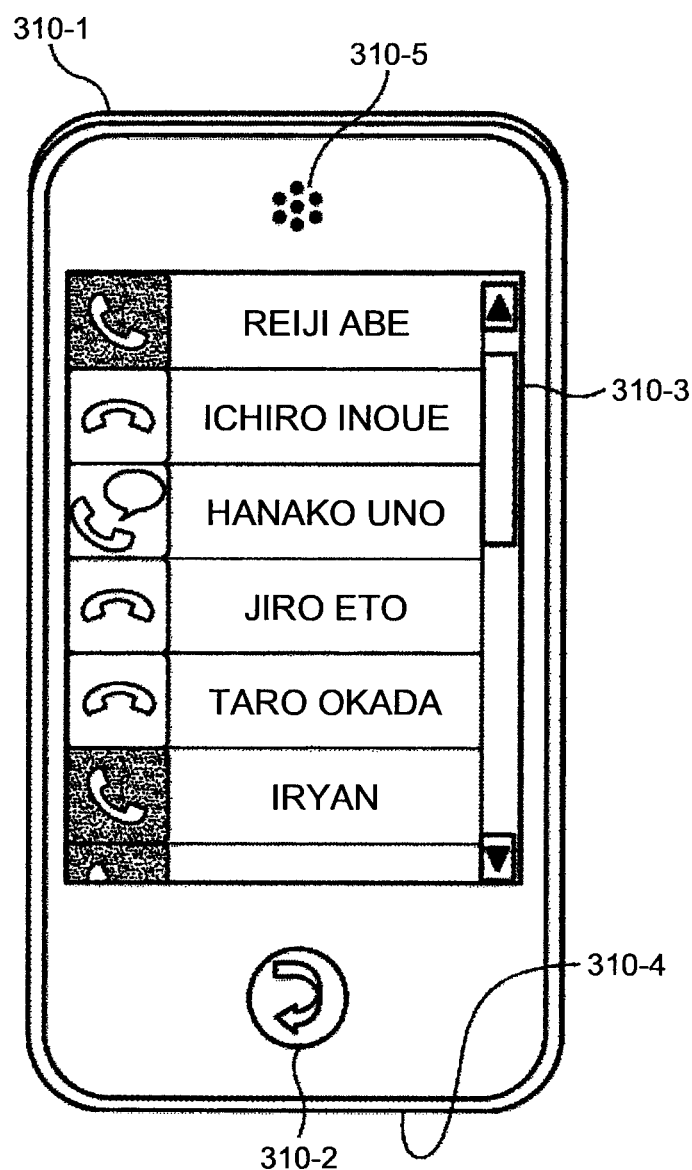
FIG. 28 is a conceptual diagram illustrating a destination list according to another embodiment.

The transmission system 1 may be a mobile phone communication system. In this case, for example, a terminal 310 corresponds to a mobile phone. An example of the display of a destination list in this case is illustrated in FIG. 28. FIG. 28 is a conceptual diagram illustrating a destination list according to another embodiment. That is, the terminal 310, which is a mobile phone, includes a mobile phone body 310-1, a menu screen display button 310-2 that is provided in the body 310-1, a display unit 310-3 that is provided in the body 310-1, a microphone 310-4 that is provided at a lower part of the body 310-1, and a speaker 310-5 that is provided in the body 310-1. Among the components, the "menu screen display button" 310-2 is for displaying a menu screen on which icons indicating various kinds of applications are displayed. The display unit 310-3 is a touch panel and can communicate with the mobile phone of the other party when the user selects a destination name.

In the above-described embodiment, the image data and the voice data are given as an example of the content data, but the invention is not limited thereto. For example, touch data may be used as the content data. In this case, one terminal transmits the sense of touch of the user to another terminal. In addition, the content data may be smell data. In this case, the smell of one terminal is transmitted to another terminal. In addition, the content data may be at least one of the image data, the voice data, the touch data, and the smell data.

In the above-described embodiment, the teleconference is held by the transmission system 1, but the invention is not limited thereto. The transmission system 1 may be used for a meeting or a general conversation between members of a family or between friends, or to provide information in one direction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A transmission management system, comprising:
a memory that, when transmission terminals perform communication through a reservation, stores transmission terminal identification information used to identify each transmission terminal and reservation identification information used to identify the reservation so as to be associated with each other;
a receiver that receives, from a first transmission terminal, a request to acquire a state of a second transmission terminal participating in a session corresponding to a predetermined reservation, the request including a reservation identifier and being transmitted from the first transmission terminal when a user of the first transmission terminal selects the session corresponding to the predetermined reservation;
processing circuitry that extracts the reservation identification information associated with transmission terminal identification information used to identify the second transmission terminal from the memory when the receiver receives the request, and determines whether the extracted reservation identification information matches the reservation identifier; and
a transmitter that, when the processing circuitry determines that the reservation identification information matches the reservation identifier, transmits first state information indicating a first state of the second transmission terminal to the first transmission terminal so as to cause the first state to be displayed on a screen of the first transmission terminal as a state related to the predetermined reservation of the second transmission terminal, but when the processing circuitry determines that the reservation identification information does not match the reservation identifier, transmits second state information indicating a second state of the second transmission terminal to the first transmission terminal so as to cause the second state to be displayed on the screen of the first transmission terminal as the state related to the predetermined reservation of the second transmission terminal, wherein the first state indicates that the second transmission terminal has already entered a session based on the predetermined reservation, and the second state indicates that the second transmission terminal is participating in another session different from the session based on the predetermined reservation,
wherein the processing circuitry causes the transmitter to transmit, to the first transmission terminal, the first state information, which causes the first transmission terminal to display a first icon in a destination list on a screen, and to transmit, to the first transmission terminal, the second state information, which causes the first transmission terminal to display a second icon different from the first icon in the destination list on the screen.

2. The transmission management system according to claim 1, wherein the memory, when communication between the transmission terminals is reserved, stores reservation identification information used to identify the reservation and transmission terminal identification information used to identify the transmission terminals that are reserved to perform the reserved communication so as to be associated with each other; and
the processing circuitry, when the receiver receives the request, extracts the transmission terminal identification information used to identify the second transmission terminal which is associated with the reservation identification information used to identify the predetermined reservation from the memory.

3. The transmission management system according to claim 1,
wherein, when the extracted reservation identification information is identical to the reservation identifier used to identify the predetermined reservation, the processing circuitry determines that the reservation matches the predetermined reservation, but when the extracted reservation identification information is not identical to the reservation identifier used to identify the predetermined reservation, the processing circuitry determines that the reservation does not match the predetermined reservation.

4. A transmission system, comprising:
a plurality of transmission terminals that perform content data communication therebetween through a communication network; and
the transmission management system according to claim 1.

5. A computer program product comprising a non-transitory computer-readable medium containing a transmission management system program that is used in the transmission management system according to claim 1 and causes the transmission management system to perform:
receiving a request to acquire a state of a second transmission terminal from a first transmission terminal participating in a session corresponding to a predetermined reservation, the request including a reservation identifier and being transmitted from the first transmission terminal when a user of the first transmission terminal selects the session corresponding to the predetermined reservation;
extracting reservation identification information associated with transmission terminal identification information used to identify the second transmission terminal from the memory when the request is received;
determining whether the extracted reservation identification information matches the reservation identifier; and
transmitting, when it is determined that the reservation identification information matches the reservation identifier, the first state information indicating the first state of the second transmission terminal to the first transmission terminal so as to cause the first state to be displayed on a screen of the first transmission terminal as a state related to the predetermined reservation of the second transmission terminal, but transmitting, when it is determined that the reservation identification information does not match the reservation identifier, the second state information indicating the second state of the second transmission terminal to the first transmission terminal so as to cause the second state to be displayed on the screen of the first transmission terminal as the state related to the predetermined reservation of the second transmission terminal.

6. A transmission management method performed in a transmission management system, the method comprising:
storing in a memory, when transmission terminals perform communication through a reservation, transmission terminal identification information used to identify each transmission terminal and reservation identification information used to identify the reservation so as to be associated with each other;
receiving a request to acquire a state of a second transmission terminal from a first transmission terminal participating in a session corresponding to a predetermined reservation, the request including a reservation identifier and being transmitted from the first transmission terminal when a user of the first transmission terminal selects the session corresponding to the predetermined reservation;
extracting the reservation identification information associated with transmission terminal identification information used to identify the second transmission terminal from the memory when the request is received;
determining whether the extracted reservation identification information matches the reservation identifier; and
transmitting, when it is determined that the reservation identification information matches the reservation identifier, first state information indicating a first state of the second transmission terminal to the first transmission terminal so as to cause the first state to be displayed on a screen of the first transmission terminal as a state related to the predetermined reservation of the second transmission terminal, but transmitting, when it is determined that the reservation identification information does not match the reservation identifier, second state information indicating a second state of the second transmission terminal to the first transmission terminal so as to cause the second state to be displayed on the screen of the first transmission terminal as the state related to the predetermined reservation of the second transmission terminal, wherein the first state indicates that the second transmission terminal has already entered a session based on the predetermined reservation, and the second state indicates that the second transmission terminal is participating in another session different from the session based on the predetermined reservation,
wherein the transmitting step includes transmitting, to the first transmission terminal, the first state information, which causes the first transmission terminal to display a first icon in a destination list on a screen, and to transmitting, to the first transmission terminal, the second state information, which causes the first transmission terminal to display a second icon different from the first icon in the destination list on the screen.

7. The transmission management system of claim 1, wherein the processing circuitry determines whether an operating state of the second transmission terminal is busy before the processing circuitry determines that the reservation identification information matches the reservation identifier.

8. The transmission management system of claim 7, wherein the transmitter transmits, to the first transmission terminal, third state information indicating a third state of the second transmission terminal, when the processing circuitry determines that the operating state of the second transmission is not busy, wherein the third state indicates that the second transmission terminal is off line.

* * * * *